(12) United States Patent  
Shirono

(10) Patent No.: US 8,334,909 B2  
(45) Date of Patent: Dec. 18, 2012

(54) IMAGE SHAKE CORRECTION DEVICE

(75) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 12/745,301

(22) PCT Filed: Nov. 28, 2008

(86) PCT No.: PCT/KR2008/007048  
§ 371 (c)(1),  
(2), (4) Date: May 28, 2010

(87) PCT Pub. No.: WO2009/069968  
PCT Pub. Date: Jun. 4, 2009

(65) Prior Publication Data  
US 2010/0309324 A1 Dec. 9, 2010

(30) Foreign Application Priority Data  
Nov. 28, 2007 (JP) ................................ 2007-306829

(51) Int. Cl.  
*H04N 5/228* (2006.01)  
*G03B 17/00* (2006.01)

(52) U.S. Cl. ........... 348/208.99; 348/208.22; 348/208.4; 348/208.5; 396/52; 396/54; 396/55

(58) Field of Classification Search ............. 348/208.99, 348/208.22, 208, 7, 4, 5; 396/52, 54, 55  
See application file for complete search history.

(56) References Cited

U.S. PATENT DOCUMENTS

| 5,835,799 | A | 11/1998 | Washisu |
| 5,930,531 | A * | 7/1999 | Kitagawa et al. ............... 396/55 |
| 6,064,827 | A | 5/2000 | Toyoda |
| 6,397,008 | B2 | 5/2002 | Kuwana et al. |
| 6,603,927 | B2 | 8/2003 | Enomoto |
| 6,985,176 | B2 | 1/2006 | Noguchi |

(Continued)

FOREIGN PATENT DOCUMENTS

CN 1831622 A 9/2006

(Continued)

OTHER PUBLICATIONS

Office Action established for JP2007-306829 (Aug. 23, 2011).

(Continued)

*Primary Examiner* — John Villecco  
*Assistant Examiner* — Selam Gebriel  
(74) *Attorney, Agent, or Firm* — Drinker Biddle & Reath LLP

(57) ABSTRACT

Provided is an image shake correction device which can be miniaturized without degrading a correction performance thereof. The image shake correction device includes a support supporting a lens; a moving portion installed independently from the support and moving the support on a plane that is approximately perpendicular to an optical axis of the lens, wherein the moving portion comprises a first moving portion moving the support in a first direction and a second moving portion moving the support in a second direction that is perpendicular to the first direction; a prop supporting the support; a pressurizing member pressurizing the support toward the prop by applying force to the moving portion; a first driving portion driving the first moving portion; and a second driving portion driving the second moving portion.

13 Claims, 16 Drawing Sheets

U.S. PATENT DOCUMENTS

| | | | |
|---|---|---|---|
| 7,539,404 B2 | 5/2009 | Iwasaki et al. | |
| 7,773,119 B2 | 8/2010 | Wada et al. | |
| 7,777,969 B2* | 8/2010 | Shirono et al. | 359/698 |
| 7,826,734 B2* | 11/2010 | Shirono et al. | 396/85 |
| 7,973,855 B2* | 7/2011 | Shirono | 348/374 |
| 8,009,979 B2* | 8/2011 | Shirono | 396/535 |
| 8,059,158 B2* | 11/2011 | Shirono | 348/208.7 |
| 2001/0004420 A1 | 6/2001 | Kuwana et al. | |
| 2004/0233303 A1* | 11/2004 | Okutani et al. | 348/240.3 |
| 2005/0168584 A1* | 8/2005 | Uenaka | 348/208.99 |
| 2005/0190267 A1* | 9/2005 | Uenaka et al. | 348/208.99 |
| 2005/0195286 A1* | 9/2005 | Uenaka et al. | 348/208.99 |
| 2005/0200713 A1* | 9/2005 | Uenaka et al. | 348/208.99 |
| 2005/0265704 A1* | 12/2005 | Uenaka et al. | 396/55 |
| 2005/0265705 A1* | 12/2005 | Uenaka | 396/55 |
| 2005/0270379 A1* | 12/2005 | Seo | 348/208.5 |
| 2005/0286887 A1* | 12/2005 | Uenaka et al. | 396/322 |
| 2006/0002693 A1* | 1/2006 | Ogawa | 396/54 |
| 2006/0064884 A1* | 3/2006 | Seo | 33/1 M |
| 2006/0082658 A1 | 4/2006 | Lee et al. | |
| 2006/0132613 A1 | 6/2006 | Shin et al. | |
| 2006/0204233 A1* | 9/2006 | Miyamoto | 396/55 |
| 2006/0285840 A1* | 12/2006 | Takahashi | 396/55 |
| 2007/0009243 A1* | 1/2007 | Takahashi | 396/55 |
| 2007/0009244 A1* | 1/2007 | Takahashi | 396/55 |
| 2007/0065128 A1* | 3/2007 | Liao et al. | 396/55 |
| 2007/0133967 A1* | 6/2007 | Takahashi et al. | 396/55 |
| 2007/0212046 A1 | 9/2007 | Sogoh et al. | |
| 2007/0217775 A1* | 9/2007 | Shirono et al. | 396/72 |
| 2007/0229702 A1* | 10/2007 | Shirono et al. | 348/374 |
| 2007/0257989 A1* | 11/2007 | Shirono | 348/208.99 |
| 2007/0263996 A1 | 11/2007 | Iwasaki et al. | |
| 2008/0187301 A1* | 8/2008 | Takahashi | 396/55 |

FOREIGN PATENT DOCUMENTS

| | | |
|---|---|---|
| CN | 101071250 A | 11/2007 |
| JP | 04-180040 A | 6/1992 |
| JP | 08-248464 A | 9/1996 |
| JP | 10-186433 A | 7/1998 |
| JP | 10-254008 A | 9/1998 |
| JP | 11-007051 A | 1/1999 |
| JP | 2001-174857 A | 6/2001 |
| JP | 2002-196382 A | 7/2002 |
| JP | 2003-075881 A | 3/2003 |
| JP | 2003-107549 A | 4/2003 |
| JP | 2006-115452 A | 4/2006 |
| JP | 2006-154345 A | 6/2006 |
| JP | 2006-171694 A | 6/2006 |
| JP | 2007-156063 A | 6/2007 |
| JP | 2007-240736 A | 9/2007 |
| JP | 2007-316569 A | 12/2007 |
| KR | 1020060068913 A | 6/2006 |

OTHER PUBLICATIONS

Notice of Allowance established for JP2007-306829 (Apr. 24, 2012).
Office Action established for CN 200880118251.2 (Jul. 4, 2012).

* cited by examiner

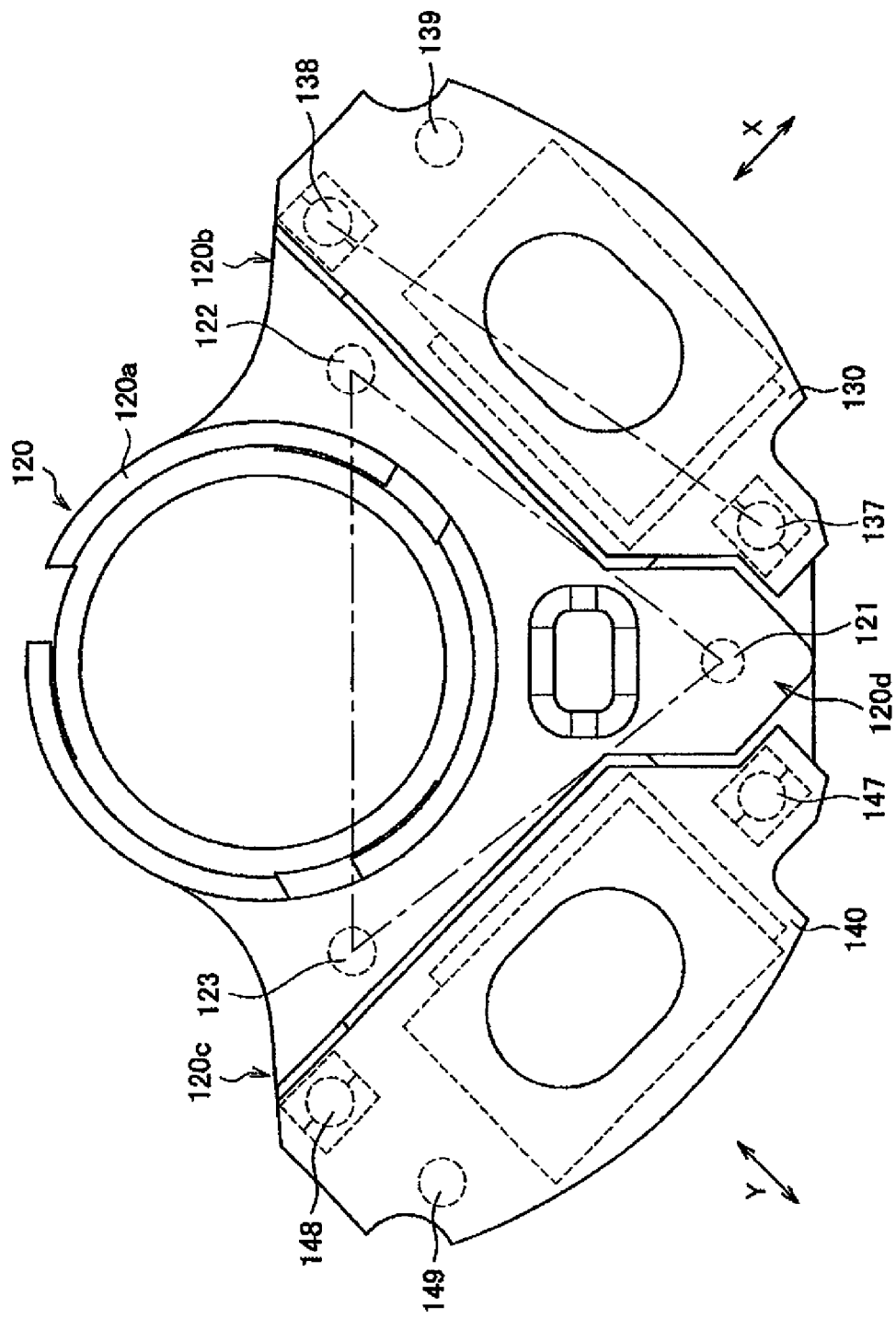

IMAGE SHAKE CORRECTION DEVICE

CROSS REFERENCE TO RELATED APPLICATIONS

This application is the U.S. national phase of the International Patent Application No. PCT/KR2008/007048 filed Nov. 28, 2008, which claims the benefit of Japanese Patent Application No. 2007-306829 filed Nov. 28, 2007, the entire content of which is incorporated herein by reference.

BACKGROUND

The present invention relates to an image shake correction device, and more particularly, to an image shake correction device that operates in a lens shift manner.

Image shake correction devices correct image shake when conducting photographing operations using photographing apparatus, such as still cameras and video cameras. Recently, as the number of pixels of imaging devices, such as a charge coupled device (CCD), has increased, when an image is enlarged and displayed on a display device, fine shaking can be observed. Thus, image shake correction devices are installed in small-sized digital cameras.

Image shake correction devices are classified into two types, image shake correction devices that operate in a lens shift manner and image shake correction devices that operate in a CCD shift manner. Image shake correction devices that operate in the lens shift manner correct image shake by driving a part of a lens installed in a lens housing according to hand vibration. Since a lens driven in the lens shift manner is lightweight, the lens may be constituted by a weak actuator; however, it is difficult to design the lens. On the other hand, an image shake correction device that operates in the CCD shift manner corrects image shake by driving the CCD according to hand vibration. An image shake device that operates in the CCD shift manner may constitute only a photographing apparatus without the need of a lens. However, since the driven CCD is relatively heavy, a strong actuator is needed. Thus, it is difficult to miniaturize the photographing apparatus, and power consumption of the actuator is large.

In order to address the problem described above regarding the image shake correction device that operates in the lens shift manner, U.S. Pat. No. 5,835,799 discloses an image shake correction device in which a magnet as a part of a driving portion for moving a lens for image shake correction in two directions that are perpendicular to an optical axis of the lens is installed as one body. The magnet is installed at a moving portion that moves in a correction direction in the state where the lens for image shake correction is supported. An electronic driving force is generated in the magnet due to a coil installed at a prop supporting the moving portion so that the position of the lens can be corrected. Such an image shake correction device may be implemented in a simple structure.

In addition, U.S. Pat. No. 6,064,827 discloses an image shake correction device in which a moving portion moving a support and a support for a lens are formed as one body and the support for the lens is elastically pressurized on a prop in the state where a plurality of balls are inserted between the support and the prop. In the image shake correction device disclosed in U.S. Pat. No. 6,064,827, the balls must be rolled within a range where the lens is corrected, which results in a reduction in sliding resistance that has an adverse affect on a correction driving force.

Japanese Patent Laid-open Application No. hei 4-180040 discloses an image shake correction device in which a support supporting a lens and a moving portion moving the support are separately constituted. In the image shake correction device disclosed in Japanese Patent Laid-open Application No. hei 4-180040, the support and the moving portion are separately constituted so that the lens can be easily moved in each moving direction.

However, in the image shake correction devices disclosed in U.S. Pat. No. 5,835,799 and U.S. Pat. No. 6,064,827, the support supporting the lens and the moving portion moving the support are constituted as one body. Thus, even when the support is moved in only one direction, the moving portion moves. In other words, the weight of the moving portion that does not need to move is included in a driven weight. Thus, a correction driving performance may be easily degraded. In addition, a moving range of the moving portion that does not need to move is required. Thus, the image shake correction device may be relatively large in size.

In addition, in the image shake correction device disclosed in U.S. Pat. No. 6,064,827, when the moving portion moves with respect to the prop, the moving portion is not securely guided and controlled in two directions. Thus, even when the support is moved in only one direction, crosstalk due to slight movement of the support in other directions occurs, and a correction performance may be degraded.

In addition, in the image shake correction device disclosed in Japanese Patent Laid-open Application No. hei 4-180040, backlash occurs between the support for the lens and the moving portion in a correction direction and in the direction of the optical axis of the lens, and a correction performance is degraded. In addition, since the moving portion is installed in an external mould of the support supporting the lens, the image shake correction device is relatively large in size.

SUMMARY

Various embodiments of the present invention provide an image shake correction device which can be miniaturized without degrading a correction performance thereof.

According to an aspect of the present invention, there is provided an image shake correction device, the image shake correction device including: a support supporting a lens; a moving portion installed independently from the support and that moves the support on a plane that is approximately perpendicular to an optical axis of the lens, wherein the moving portion comprises a first moving portion that moves the support in a first direction and a second moving portion that moves the support in a second direction that is perpendicular to the first direction; a prop that supports the support; a pressurizing member that pressurizes the support toward the prop by applying force to the moving portion; a first driving portion that drives the first moving portion; and a second driving portion that drives the second moving portion.

The image shake correction device can be miniaturized without degrading a correction performance thereof.

An image shake correction device is also provided including: a support supporting a lens; a moving portion installed independently from the support and that moves the support on a plane that is approximately perpendicular to an optical axis of the lens, wherein the moving portion comprises a first moving portion that moves the support in a first direction and a second moving portion that moves the support in a second direction that is perpendicular to the first direction; a prop that supports the support; a pressurizing member that pressurizes the support toward the prop by applying force to the moving portion; a first driving portion that drives the first moving portion; and a second driving portion that drives the second moving portion.

The support supporting the lens may be moved by the first moving portion and the second moving portion that are installed independently from the support. Thus, when the support is moved in the first direction, only the first moving portion may act on the support due to driving of the first driving portion, and when the support is moved in the second direction, only the second moving portion may act on the support due to driving of the second driving portion. In this way, the support and the two moving portions may be separated from each other so that a driven weight generated when the support is moved can be reduced and a correction performance of the image shake correction device can be improved. In addition, since each of the two moving portions moves in only one direction, a range of movement of each of the first and second moving portions can be made small, and the image shake correction device can be miniaturized. In addition, a pressurizing member that pressurizes the support toward the prop may be arranged so that shaking of the support in a tilt direction can be suppressed.

Here, the first moving portion may be fixed on the support in the first direction and simultaneously may be installed to be movable towards the support in the second direction, and the second moving portion may be installed to be movable towards the support in the first direction and simultaneously may be fixed on the support in the second direction.

Here, each of at least two approximately V-shaped grooves that extend in the second direction may be formed in a position in which the first moving portion and the support are opposite to each other, and each of at least two approximately V-shaped grooves that extend in the first direction may be formed in a position in which the second moving portion and the support are opposite to each other, and each of a plurality of balls that support the support may be arranged between the opposite grooves.

Here, the image shake correction device may further include a sliding portion having lubrication and arranged between the support and the prop. As such, a frictional force that is generated between balls can be reduced, and an adverse effect on a driving force used to move the support can be excluded.

Here, the first driving portion and the second driving portion may include a magnet that generates a magnetic field that is approximately parallel to the optical axis of the lens and a coil arranged to be opposite to the magnet, and the magnet may be installed at one side of sides in which the first moving portion, the second moving portion, and the prop are opposite to one another, and the coil may be installed at the other side, and a side in which the magnet and the coil are opposite to each other may be approximately perpendicular to the optical axis of the lens.

Here, the pressurizing member may include a magnetic member and may be arranged between the moving portion and the prop or between the prop and the coil. As such, an attractive force is generated between magnets that constitute the magnetic member and the driving portion, and the first moving portion and the second moving portion at which the magnets are arranged may be pulled toward the prop. The first moving portion and the second moving portion may pressurize the support toward the prop due to a force by which the first and second moving portions are pulled toward the prop. As such, the support may be pressurized toward the prop so that shake of the support in the tilt direction can be suppressed.

Here, the image shake correction device may further include a shield member arranged in a position in which two magnets disposed at the moving portion or the prop are opposite to each other and reducing an attractive force between the magnets. As such, an attractive force that acts between a magnet that constitutes the first driving portion and a magnet that constitutes the second driving portion is reduced so that an adverse effect on a driving force of each driving portion can be reduced.

In addition, the first driving portion and the second driving portion may include a magnet that generates a magnetic field that is approximately parallel to the optical axis of the lens and a coil arranged to be opposite to the magnet, and the magnet may be installed at one side of sides in which the first moving portion, the second moving portion, and the prop are opposite to one another, and the coil may be installed at the other side, and the magnet may generate a magnetic field that is approximately perpendicular to a side in which the magnet and the coil are opposite to each other, and the side in which the magnet and the coil are opposite to each other may be inclined toward a side that is perpendicular to the optical axis of the lens. As such, the size of the image shake correction device can be reduced in a direction that is perpendicular to the optical axis of the lens.

In this case, the moving portion may move along a circumferential direction of a circle in which a tangent line in a support position in which the moving portion is supported on the prop is approximately perpendicular to a direction of the optical axis of the lens, and the support may be moved in a direction of the tangent line in the support position. As such, even when the magnet and the coil are arranged to be inclined, a driving force is transferred to the support while unnecessary force is not generated in the direction of the optical axis and thus, a correction performance can be stabilized together with miniaturization of the image shake correction device.

The pressurizing member may include a magnetic member and may be arranged between the moving portion and the prop or between the prop and the coil. An attractive force is generated between magnets that constitute the magnetic member and the driving portion, and the first moving portion and the second moving portion at which the magnets are arranged may be pulled toward the prop. The first moving portion and the second moving portion may pressurize the support toward the prop due to a force by which the first and second moving portions are pulled toward the prop. As such, the support may be pressurized toward the prop so that shake of the support in the tilt direction can be suppressed.

The image shake correction device may further include a shield member arranged in a position in which two magnets disposed at the moving portion or the prop are opposite to each other and that reduces an attractive force between the magnets. As such, an attractive force that acts between the magnet that constitutes the first driving portion and the magnet that constitutes the second driving portion is reduced so that an adverse effect on a driving force of each driving portion can be reduced.

Here, at least one of two points of application that are used to pressurize the support toward the prop by using the moving portion may be placed toward the lens among regions that are divided by a line connecting two supporting points that are used to support the support on the prop. As such, the support is prevented from being detached from the image shake correction device, and a correction performance is not lowered.

In addition, the pressurizing member may include an elastic member that pressurizes the moving portion toward the prop and may be arranged to cover at least a side that is opposite to the prop of sides of the moving portion.

Here, the pressurizing member may include a guide portion that guides the moving portion to move only in a predetermined direction.

DESCRIPTION OF THE DRAWINGS

Various embodiments of the invention are illustrated below in the following drawings and appertaining descriptive text.

FIG. 8A is a partial plan view illustrating the support relationship between the support, the first moving portion, and the second moving portion of the image shake correction device when rotation occurs around a line that is perpendicular to the optical axis of the lens, according to an example for comparison with the present invention;

DETAILED DESCRIPTION OF THE EMBODIMENTS

Figure 1:
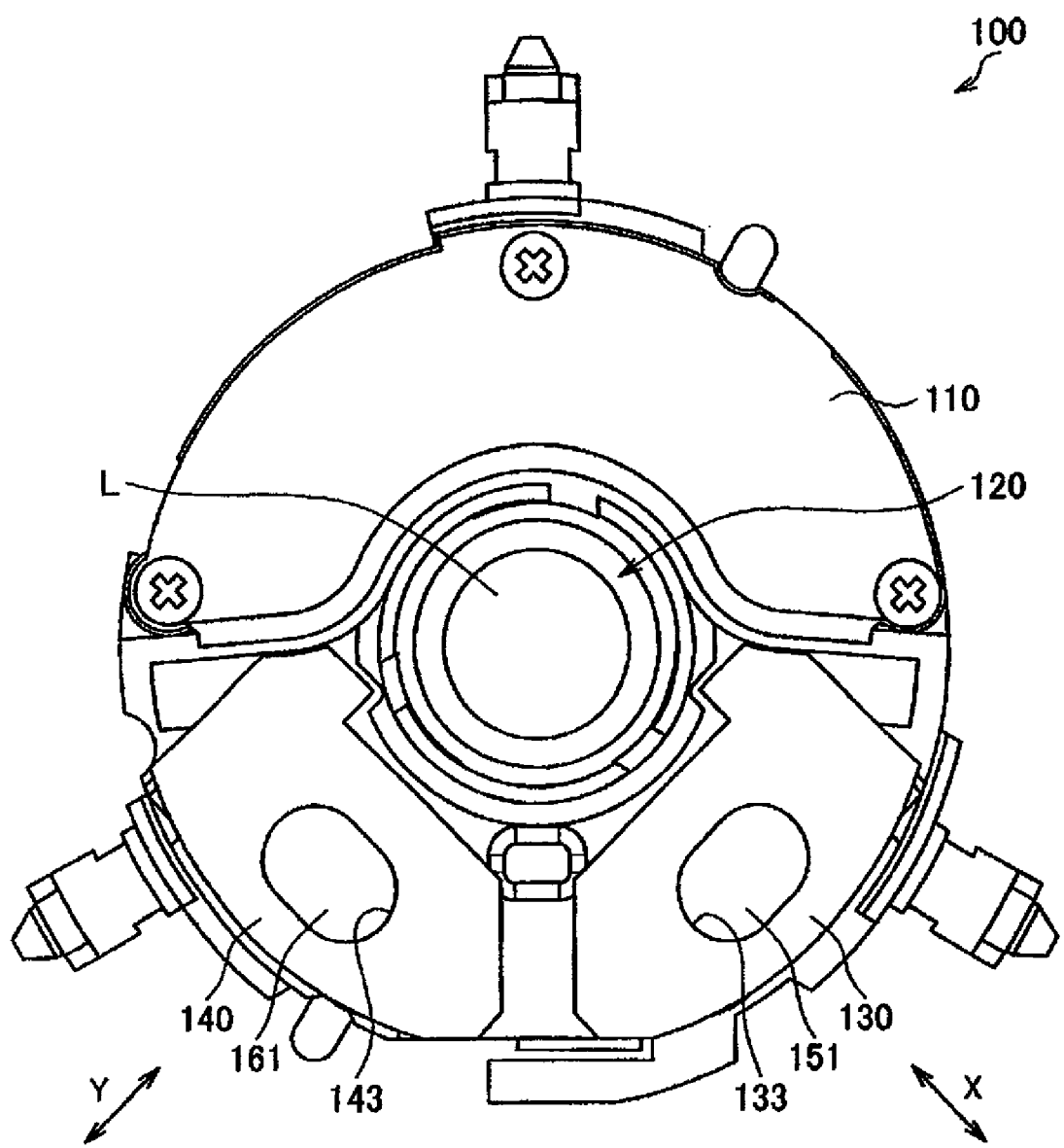
FIG. 1 is a plan view of an image shake correction device according to an embodiment of the present invention.

Hereinafter, exemplary embodiments of the present invention will be described in detail with reference to the attached drawings. In the present specification and the drawings, like elements having substantially the same functions denote like reference numerals and thus, a repeated description thereof will be omitted.

First Embodiment

Figure 2:
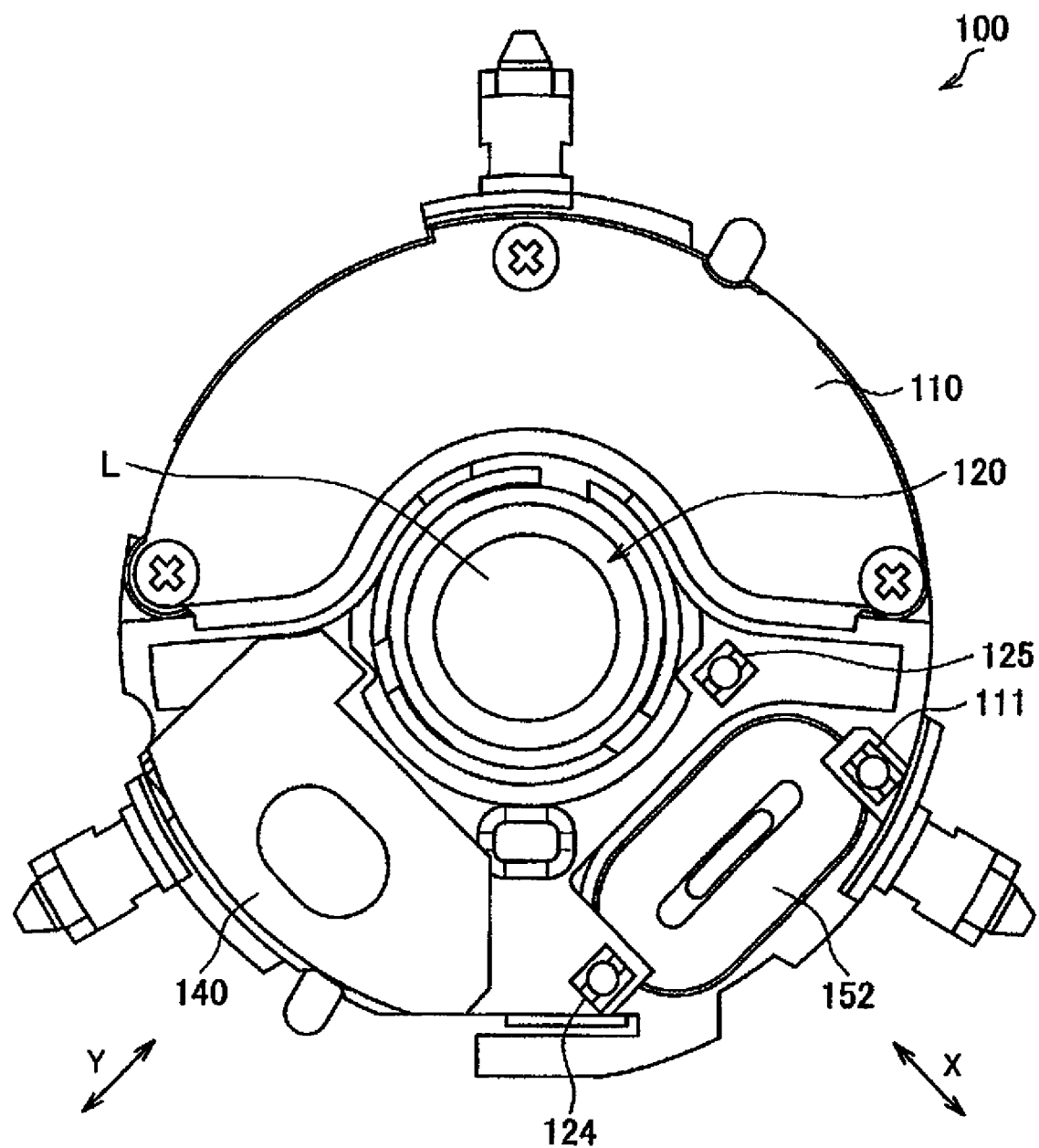
FIG. 2 is a plan view illustrating a structure of the image shake correction device illustrated in FIG. 1 when a first moving portion and a first magnet are excluded therefrom.
Figure 3:
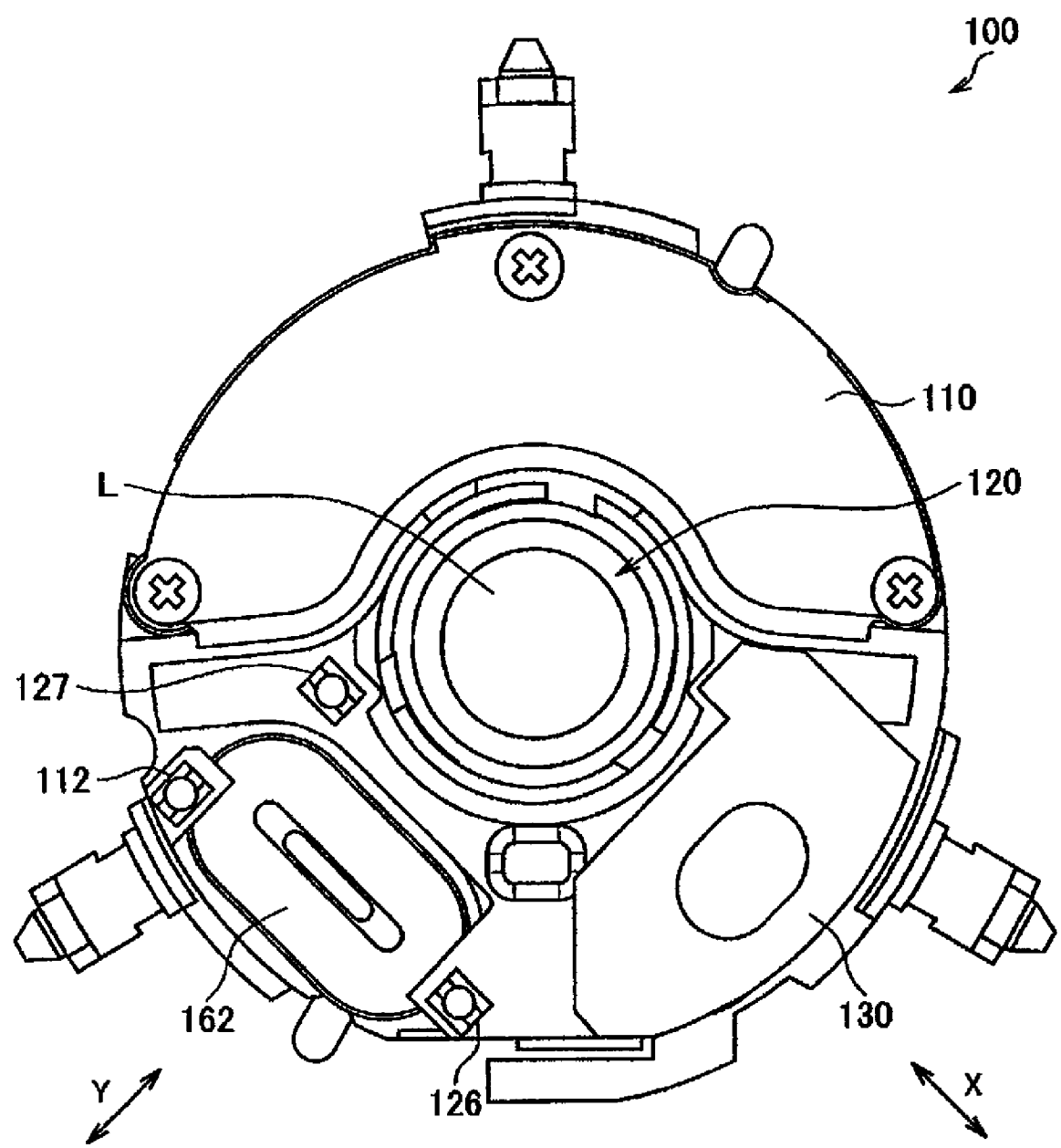
FIG. 3 is a plan view illustrating a structure of the image shake correction device illustrated in FIG. 1 when a second moving portion and a second magnet are excluded therefrom.
Figure 4:
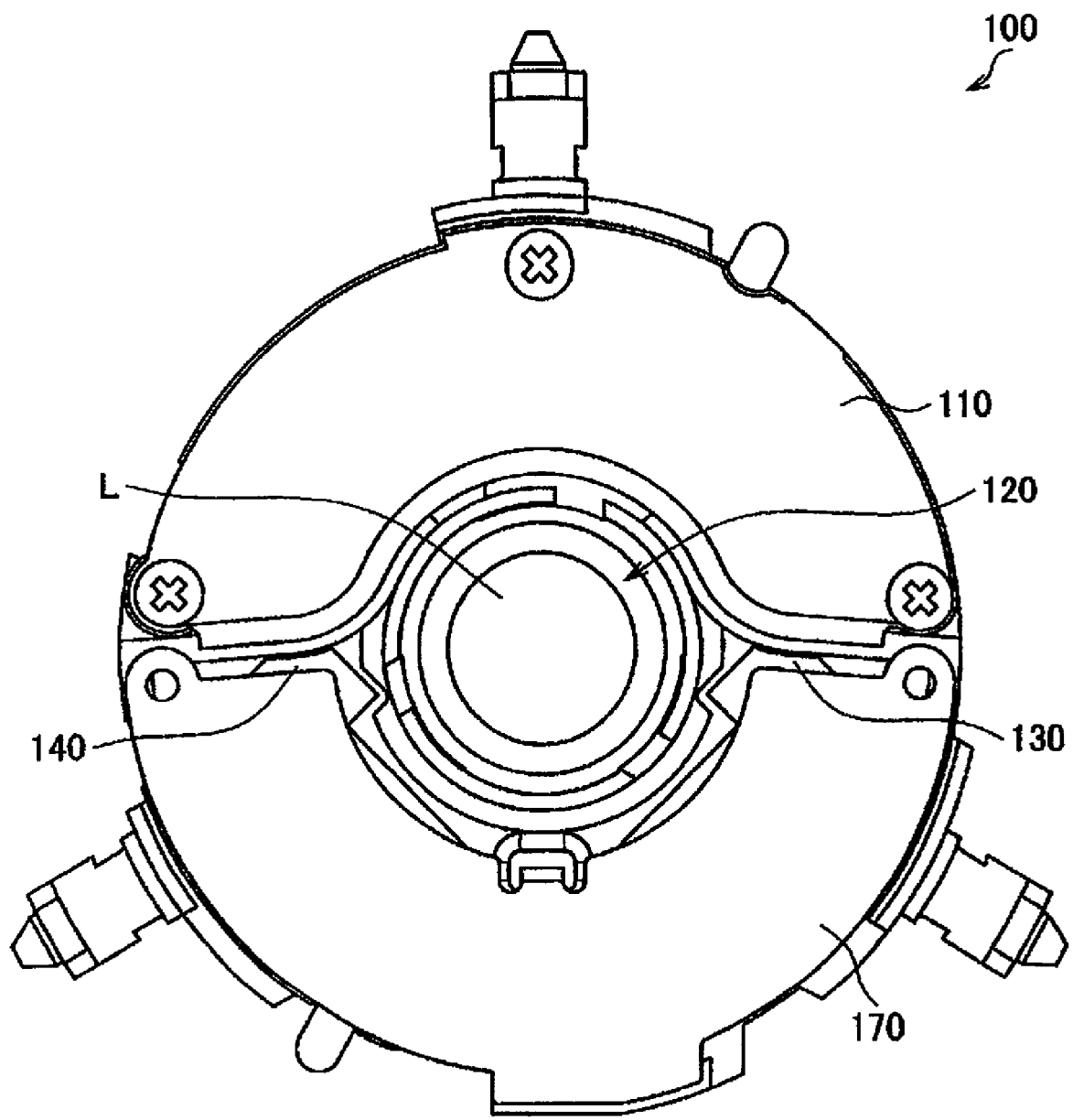
FIG. 4 is a plan view illustrating a structure of image shake correction device illustrated in FIG. 1 when a cover plate is installed therein.
Figure 5:
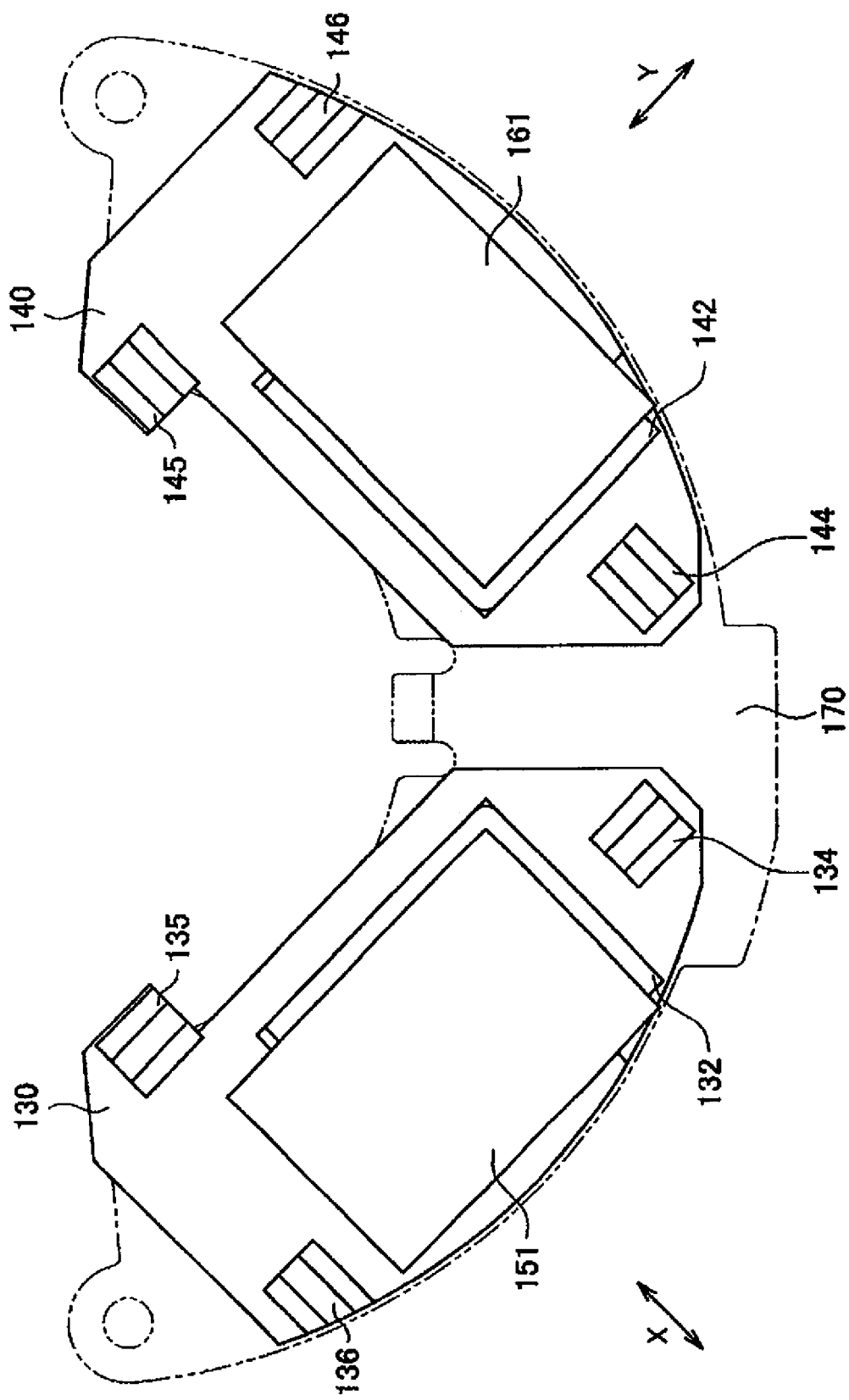
FIG. 5 is a partial rear view illustrating a structure of the first moving portion and the second moving portion of the image shake correction device illustrated in FIG. 1, according to an embodiment of the present invention.
Figure 6:
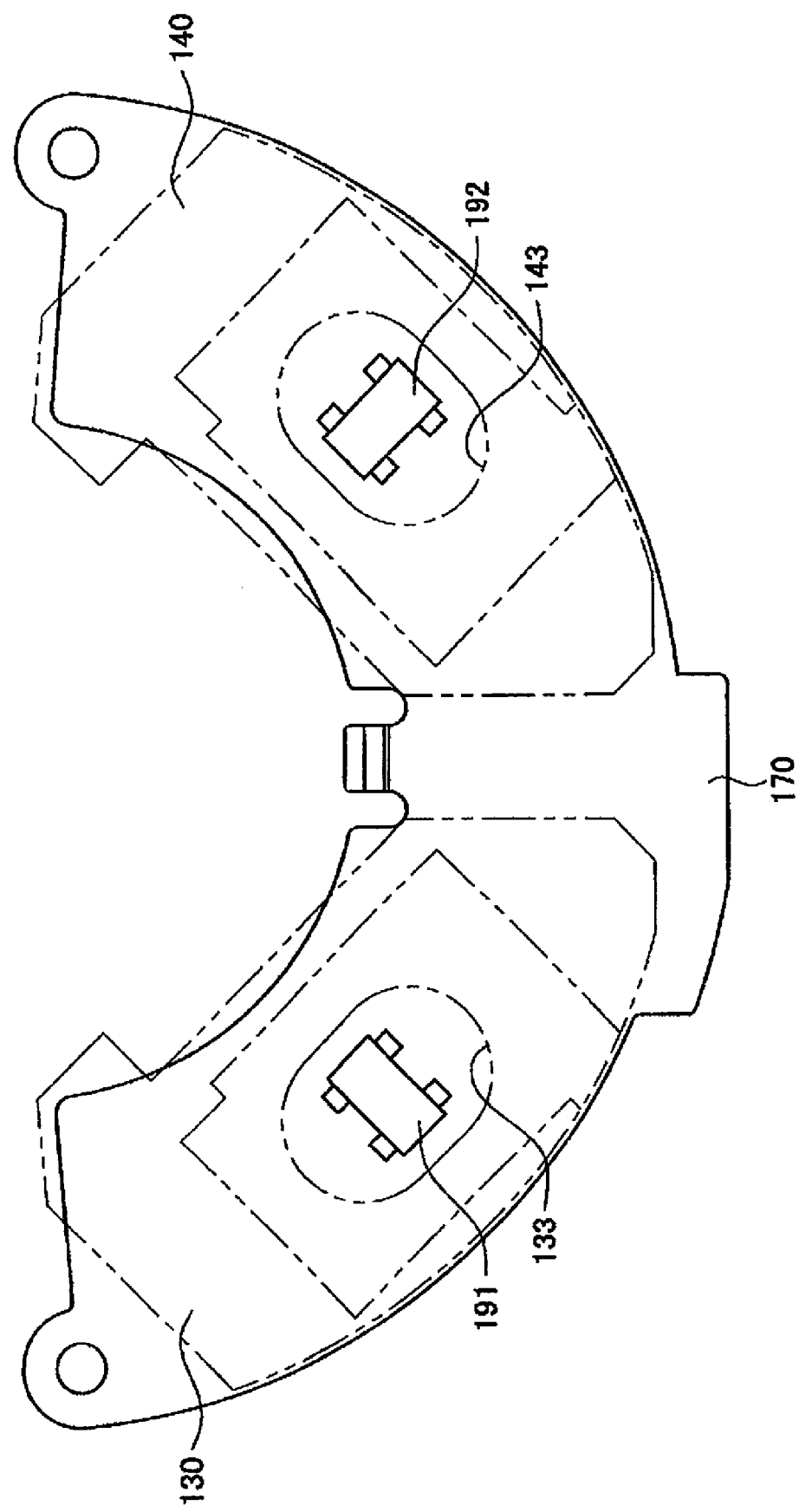
FIG. 6 is a partial rear view illustrating a hole element that detects movement of a support and a cover plate of the image shake correction device illustrated in FIG. 1, according to an embodiment of the present invention.

First, a structure of an image shake correction device according to an embodiment of the present invention will be described with reference to FIGS. 1 through 6. FIG. 1 is a plan view illustrating a structure of an image shake correction device 100 according to an embodiment. FIG. 2 is a plan view illustrating a structure of the image shake correction device 100 illustrated in FIG. 1 when a first moving portion 130 and a first magnet 151 are excluded therefrom. FIG. 3 is a plan view illustrating a structure of the image shake correction device 100 illustrated in FIG. 1 when a second moving portion 140 and a second magnet 161 are excluded therefrom. FIG. 4 is a plan view illustrating a structure of the image shake correction device 100 illustrated in FIG. 1 when a cover plate 170 is installed therein. FIG. 5 is a partial rear view illustrating a structure of the first moving portion 130 and the second moving portion 140 of the image shake correction device 100 illustrated in FIG. 1. FIG. 6 is a partial rear view illustrating a hole element that detects movement of a support and a cover plate of the image shake correction device 100 illustrated in FIG. 1.

Structure of Image Shake Correction Device

The image shake correction device 100 according to the current embodiment is an image shake correction device that is installed in the vicinity of a shutter of a photographing apparatus such as a camera or video camera and operates in a lens shift manner. Referring to FIGS. 1 through 3, the image shake correction device 100 according to the current embodiment includes a support 120 that is supported by a prop 110 and supports a lens L, a first moving portion 130 that moves the support 120 in a first direction, a second moving portion 140 that moves the support 120 in a second direction, a first driving portion that drives the first moving portion 130, and a second driving portion that drives the second moving portion 140.

The support 120 supports the lens L. The support 120 includes an approximately cylindrical lens support (120a of FIG. 7A) that supports the lens L and extends in a direction of an optical axis of the lens L, and a support plate that supports the lens support 120a on the prop 110.

Figure 7A:
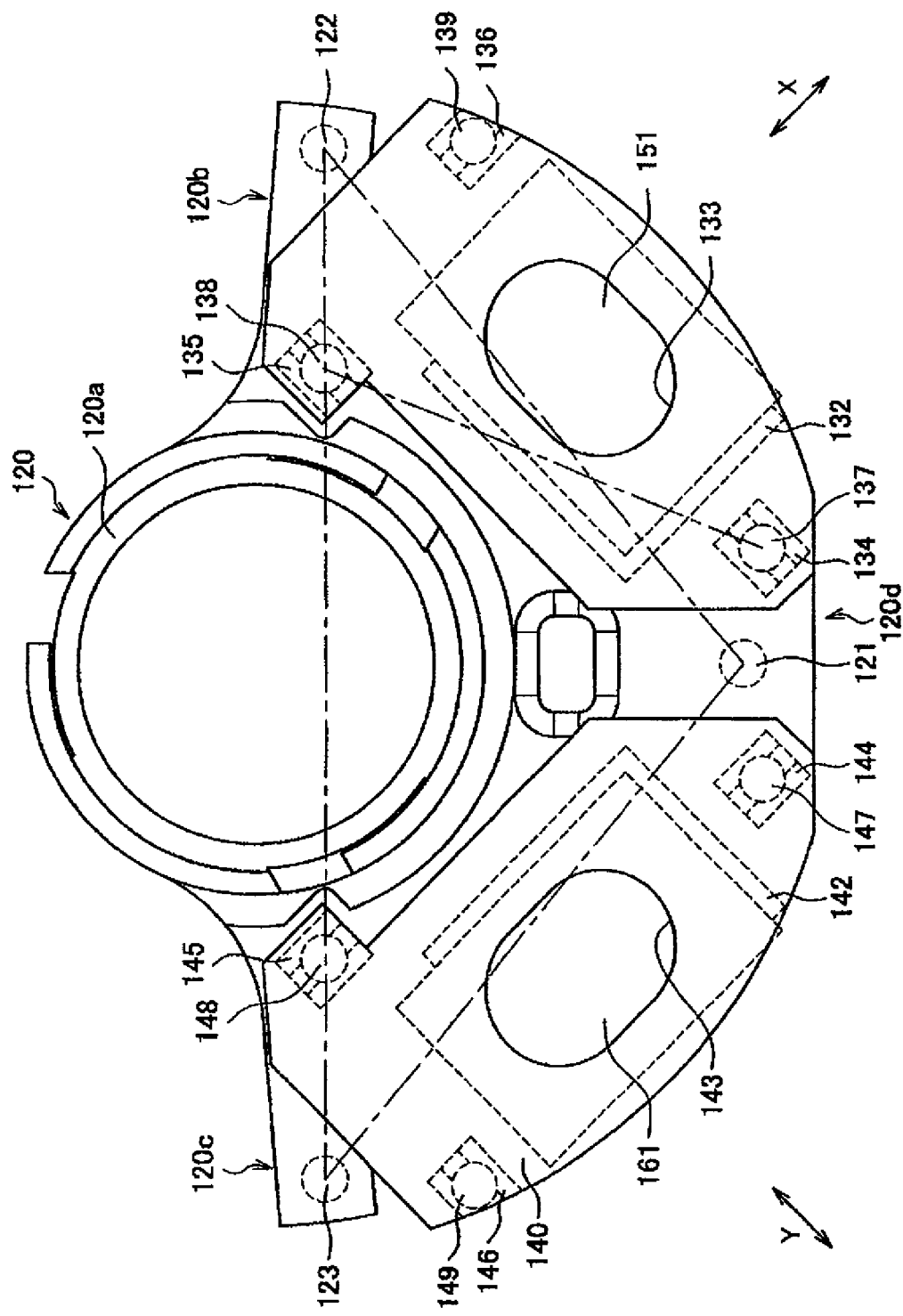
FIG. 7A is a partial plan view illustrating the support relationship between the support, the first moving portion, and the second moving portion of the image shake correction device illustrated in FIG. 1, according to an embodiment of the present invention.

Here, the support plate comprises three parts 120b, 120c, and 120d indicated in FIG. 7A and is a sheet-shaped member that is arranged perpendicular to an optical axis of the lens L.

The support 120 is constituted so that the support plate is supported at three points by using three balls on the prop 110 and the support 120 moves on a plane that is perpendicular to the optical axis of the lens L. The support 120 is moved in a first direction and in a second direction that is perpendicular to the first direction by the first moving portion 130 and the second moving portion 140 that is described below. Details of this operation will be described below.

The first moving portion 130 moves the support 120 in the first direction, for example, in an X-direction. The first moving portion 130 is installed on a plane that is perpendicular to the optical axis of the lens L and is supported by using balls 137 and 138 that are accommodated at two points of the support 120 and by using a ball 139 that is accommodated at a one point of the prop 110.

The first moving portion 130 may move together with the support 120 in the X-direction and may move separately from the support 120 in the Y-direction that is perpendicular to the X-direction. That is, the first moving portion 130 may move separately in the Y-direction.

Referring to FIG. 5, three guide portions 134, 135, and 136 that guide the balls 137, 138, and 139 are arranged at a side of a portion of the first moving portion 130, wherein the side is opposite to the prop 110. The guide portions 134 and 135 may be arranged in the form of approximately V-shaped grooves that extend in the Y-direction, for example. In addition, the balls 137 and 138 that support the first moving portion 130 on the support 120 are accommodated in the guide portions 134 and 135.

The guide portion 136 may be arranged in the form of an approximately V-shaped groove that extends in the X-direction, for example. The ball 139 that supports the first moving portion 130 on the prop 110 is accommodated in the guide portion 136.

Referring to FIG. 2, three guide portions 124, 125, and 111 that have the same shapes as the guide portions 134, 135, and 136 are arranged in a position opposite to the guide portions 134, 135, and 136 of a portion of the support 120 and the prop 110.

In addition, a through hole 133 is formed in the middle of the first moving portion 130. Referring to FIG. 5, the first magnet 151 having an approximately rectangular shape is arranged at a side of a portion of the first moving portion 130 to cover the through hole 133, wherein the side is opposite to the prop 110.

An approximately L-shaped first shield member 132 is arranged at two side surfaces that are opposite to the second magnet 161 that will be described below, of a portion of the first magnet 151 to cover the two side surfaces. The first shield member 132 is arranged to reduce an attractive force that is generated between the first magnet 151 and the second magnet 161. Thereby, a driving force that is generated by the first and second driving portions is not affected by the attractive force between the first magnet 151 and the second magnet 161.

The second moving portion 140 is a member that moves the support 120 in the second direction that is perpendicular to the first direction, for example, in the Y-direction. Similarly to the first moving portion, the second moving portion 140 is installed at a side that is perpendicular to the optical axis of the lens L and is supported by using the balls 147 and 148 that are accommodated at two points of the support 120 and by using the ball 149 that is accommodated at one point of the prop 110, as illustrated in FIG. 7A.

The second moving portion 140 may move together with the support 120 in the Y-direction and may move separately from the support 120 in the X-direction that is perpendicular to the Y-direction. That is, the second moving portion 140 may move separately in the X-direction.

In addition, the second moving portion 140 according to the current embodiment is perpendicular to the optical axis of the lens L and is arranged symmetrical to the first moving portion 130 with respect to a straight line between the first moving portion 130 and the second moving portion 140 and which passes through a point (a contact point between a ball 121 of FIG. 7A and the support 120) at which the support 120 is supported on the prop 110.

Referring to FIG. 5, three guide portions 144, 145, and 146 that guide balls 147, 148, and 149 are arranged at a side of a portion of the second moving portion 140, wherein the side is opposite to the prop 110. The guide portions 144 and 145 may be arranged in the form of approximately V-shaped grooves that extend in the X-direction, for example, and the balls 147 and 148 that support the second moving portion 140 on the support 120 are accommodated in the guide portions 144 and 145.

The guide portion 146 may be arranged in the form of an approximately V-shaped groove that extends in the Y-direction, for example, and the ball 149 that supports the second moving portion 140 on the prop 110 is accommodated in the guide portion 146.

Referring to FIG. 3, three guide portions 126, 127, and 112 that have the same shapes as the guide portions 144, 145, and 146 are arranged in a position opposite to the guide portions 144, 145, and 146 of a portion of the support 120 and the prop 110.

In addition, a through hole 143 is formed in the middle of the second moving portion 140. Referring to FIG. 5, the second magnet 161 having an approximately rectangular shape is arranged at a side of a portion of the second moving portion 140 to cover the through hole 143, wherein the side is opposite to the prop 110.

An approximately L-shaped second shield member 142 is arranged at two side surfaces that are opposite to the first magnet 151, of a portion of the second magnet 161 to cover the two side surfaces. Similarly to the first shield member 132, the second shield member 142 is arranged to reduce an attractive force that is generated between the first magnet 151 and the second magnet 161.

In addition, in the current embodiment, the first moving portion 130 and the second moving portion 140 are arranged on the same plane that is perpendicular to the optical axis of the lens L.

The first driving portion drives the first moving portion 130 in the X-direction as a first direction and includes the first magnet 151 arranged at the first moving portion 130 and a first coil 152 illustrated in FIG. 2. The first driving portion may be a voice coil motor (VCM), for example.

The first driving portion moves the first moving portion 130 in the X-direction due to a driving force that is generated in the X-direction according to Fleming's left-hand rule when a current flows through the first coil 152 among magnetic fields that are generated due to the first magnet 151.

The first coil 152 is formed by winding a conductive line around a direction of the optical axis of the lens L and is installed on the prop 110 within a range where the first moving portion 130 moves. In addition, a first yoke (153 of FIG. 9) having magnetism is arranged between the first coil 152 and the prop 110. The first yoke 153 is a magnetic member that serves as a pressurizing member.

An attractive force acts between the first magnet 151 and the first yoke 153. As such, the first moving portion 130 at which the first magnet 151 is arranged is pulled toward the prop 110, and if so, the support 120 is pressurized toward the prop 110.

The second driving portion drives the second moving portion 140 in the Y-direction as a second direction and includes a second magnet 161 arranged at the second moving portion 140 and a second coil 162 illustrated in FIG. 3. The second driving portion may also be a VCM, for example.

Similarly to the first driving portion, the second driving portion moves the second moving portion 140 in the Y-direction due to a driving force that is generated in the Y-direction when a current flows through the second coil 162 among magnetic fields that are generated due to the second magnet 161.

The second coil 162 is formed by winding a conductive line around the direction of the optical axis of the lens L and is installed on the prop 110 within a range where the second moving portion 140 moves.

In addition, a second yoke (not shown) having magnetism is arranged between the second coil 162 and the prop 110. The second yoke is a magnetic member that serves as a pressurizing member.

An attractive force acts between the second magnet 161 and the second yoke. As such, the second moving portion 140 at which the second magnet 161 is arranged is pulled toward the prop 110, and if so, the support 120 is pressurized toward the prop 110.

In addition, referring to FIG. 4, a cover plate 170 that covers the first moving portion 130 and the second moving portion 140 is arranged on the first moving portion 130 and the second moving portion 140.

Referring to FIG. 6, a hole element 191 that detects the amount of movement of the first moving portion 130 and a hole element 192 that detects the amount of movement of the second moving portion 140 are arranged at sides that are opposite to the first moving portion 130 and the second moving portion 140, of a portion of the cover plate 170.

As illustrated in FIG. 6, the hole element 191 is installed in a position that corresponds to the through hole 133 of the first moving portion 130, and the hole element 192 is installed in a position that corresponds to the through hole 143 of the second moving portion 140.

The amount of movement of each of the first moving portion 130 and the second moving portion 140 that is detected by each of the hole elements 191 and 192 corresponds to the amount of movement of the support 120. A controller (not shown) of the image shake correction device 100 calculates the amount of control that is used to correct image shake by using the amount of movement of the support 120 that is detected by the hole elements 191 and 192.

A current flows through the first coil 152 and the second coil 162 according to the amount of control so that the first moving portion 130 and the second moving portion 140 can be moved and the support 120 of the lens L can be finally moved.

The structure of the image shake correction device 100 according to the current embodiment has been described above. The image shake correction device 100 moves the support 120 that supports the lens L, by using the first moving portion 130 and the second moving portion 140, which are arranged independently from each other, thereby correcting image shake. Hereinafter, an operation of the image shake correction device 100 according to the current embodiment will be described with reference to FIGS. 7A through 8B.

Figure 7B:
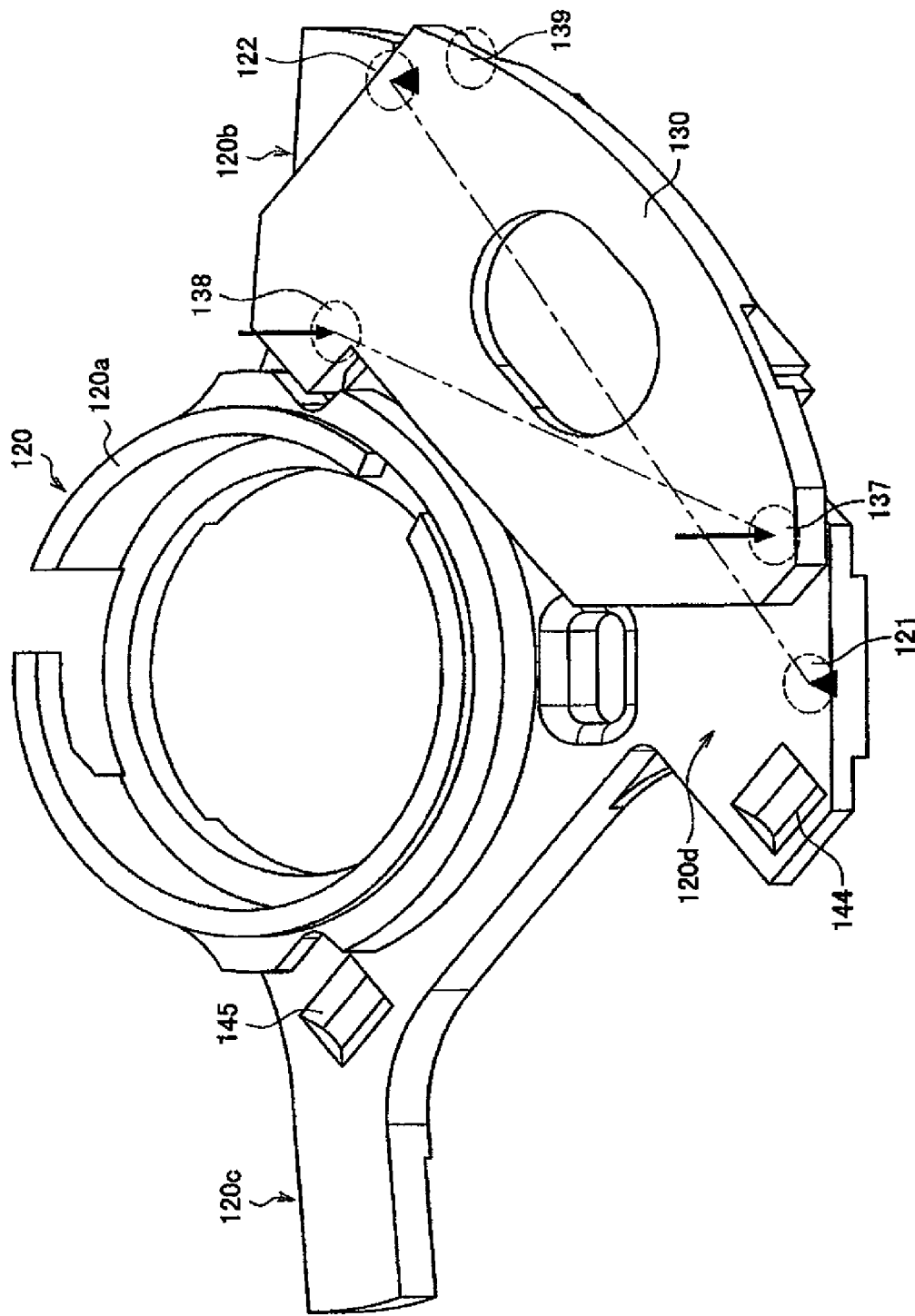
FIG. 7B is a partial perspective view illustrating the support and the first moving portion illustrated in FIG. 7A, according to an embodiment of the present invention.
Figure 8B:
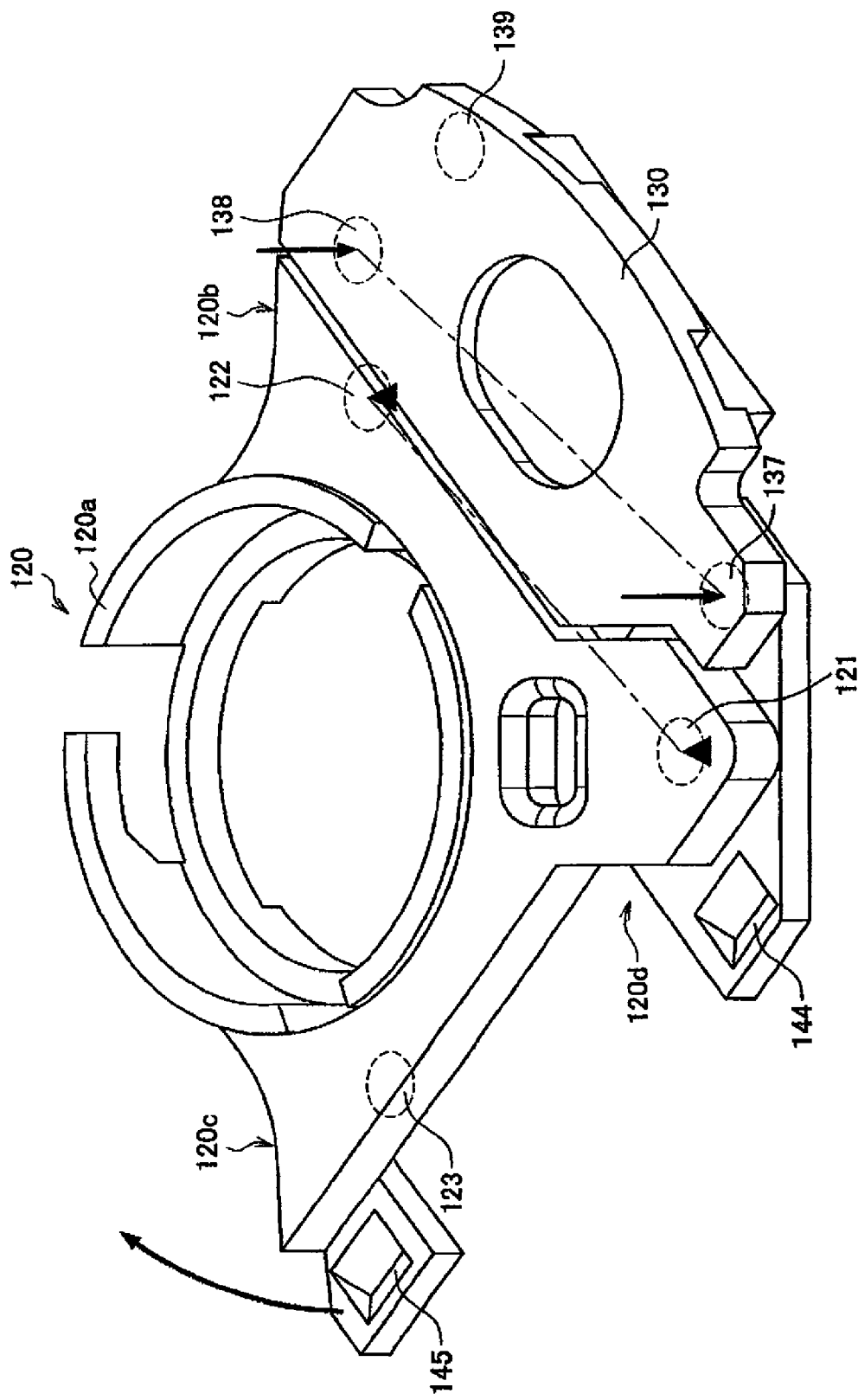
FIG. 8B is a partial perspective view illustrating the support and the first moving portion illustrated in FIG. 8A.

FIG. 7A is a partial plan view illustrating the support relationship between the support 120, the first moving portion 130, and the second moving portion 140 of the image shake correction device illustrated in FIG. 1. FIG. 7B is a partial perspective view illustrating the support 120 and the first moving portion illustrated in FIG. 7A. FIG. 8A is a partial plan view illustrating the support relationship between the support 120, the first moving portion 130, and the second moving portion 140 of the image shake correction device when rotation occurs around a line that is perpendicular to the optical axis of the lens L. FIG. 8B is a partial perspective view illustrating the support 120 and the first moving portion 130 illustrated in FIG. 8A.

Operation of Image Shake Correction Device

The image shake correction device 100 according to the current embodiment moves the first moving portion 130 in the X-direction by using the first driving portion and moves the second moving portion 140 in the Y-direction by using the second driving portion, as described previously.

Referring to FIG. 7A, the support 120 that supports the lens L is supported by using three balls 121, 122, and 123 on the prop 110 and may move on an X-Y plane that is perpendicular to the optical axis of the lens L.

In addition, as described above, the first moving portion 130 is supported on the support 120 by using the balls 137 and 138 that are accommodated in the guide portions 134 and 135 of the first moving portion 130 and the guide portions 124 and 125 of the support 120 and is supported on the prop 110 by using the ball 139 that is accommodated in the guide portion 136 of the first moving portion 130 and the guide portion 111 of the prop 110.

The second moving portion 140 is supported on the support 120 by using the balls 147 and 148 that are accommodated in the guide portions 144 and 145 of the second moving portion 140 and the guide portions 126 and 127 of the support 120 and is supported on the prop 110 by using the ball 149 that is accommodated in the guide portion 146 of the second moving portion 140 and the guide portion 112 of the prop 110.

The support 120 is moved in the X-direction together with movement of the first moving portion 130 due to a driving force generated by the first driving portion. In other words, when the first driving portion generates a driving force in the X-direction, the first moving portion 130 including the first magnet 151 is moved in the X-direction. In this case, X-direction movement of the balls 137 and 138 that are accommodated in the guide portions 134 and 135 of the first moving portion 130 and the guide portions 124 and 125 of the support 120, is constrained due to the approximately V-shaped groove shape of the guide portions 124, 125, 134, and 135, as illustrated in FIG. 7A. On the other hand, X-direction movement of the ball 139 that is accommodated in the guide portion 136 of the first moving portion 130 and the guide portion 111 of the prop 110 is not constrained and thus is guided along the approximately V-shaped groove constituting the guide portion 136 that extends in the X-direction. Thus, the support 120 that moves on an X-Y plane is moved as one body with the first moving portion 130 by using the two balls 137 and 138 on the support 120 and thus is moved in the X-direction along the guide portion 136 due to a driving force generated by the first driving portion.

In this case, the second moving portion 140 does not move in the X-direction because X-direction movement of the ball 149 that is accommodated in the guide portion 146 of the second moving portion 140 and the guide portion 112 of the prop 110 is constrained. On the other hand, the guide portions 144 and 145 of the second moving portion 140 and the guide portions 126 and 127 of the support 120 are arranged in the form of approximately V-shaped grooves that extend in the X-direction. Thus, when the support 120 moves in the X-direction, the second moving portion 140 is fixed on the prop 110 and does not move, and the support 120 is moved in the X-direction along the guide portions 126 and 127.

In addition, the support 120 is moved in the Y-direction together with movement of the second moving portion 140 due to a driving force generated by the second driving portion. In other words, when the second driving portion generates a driving force in the Y-direction, the second moving portion 140 including the second magnet 161 moves in the Y-direction. In this case, Y-direction movement of the balls 147 and 148 that are accommodated in the guide portions 144 and 145 of the second moving portion 140 and the guide portions 126 and 127 of the support 120 is constrained due to the approximately V-shaped groove shape of the guide portions 144 and 145, as illustrated in FIG. 7A. On the other hand, Y-direction movement of the ball 149 that is accommodated in the guide portion 146 of the second moving portion 140 and the guide portion 112 of the prop 110 is not constrained and thus is guided along the approximately V-shaped groove constituting the guide portion 146 that extends in the Y-direction. Thus, the support 120 that moves on the X-Y plane is moved as one body with the second moving portion 140 by using the two balls 147 and 148 on the support 120 and thus is moved in the Y-direction along the guide portion 146 due to a driving force generated by the second driving portion.

In this case, the first moving portion 130 does not move in the Y-direction because Y-direction movement of the ball 139 that is accommodated in the guide portion 136 of the first moving portion 130 and the guide portion 111 of the prop 110 is constrained. On the other hand, the guide portions 134 and 135 of the first moving portion 130 and the guide portions 124 and 125 of the support 120 are arranged in the form of approximately V-shaped grooves that extend in the Y-direction. Thus, when the support 120 is moved in the Y-direction, the first moving portion 130 is fixed on the prop 110 and does not move, and the support 120 is moved in the Y-direction along the guide portions 124 and 125.

In this way, in the combined arrangement of the support 120 and each of the first and second moving portions 130 and 140, a degree of freedom exists in driving in a direction in which each of the first and second moving portions 130 and 140 is not driven. Thus, when each of the first and second moving portions 130 and 140 does not move, the support 120 and each of the first and second moving portions 130 and 140 may be easily separated from each other so that movement of the other one of the first and second moving portions 130 and 140 is not disturbed.

Here, the support 120 and the first moving portion 130 are arranged in such a way that: a) a line connecting centers of the two balls 137 and 138 supporting the first moving portion 130 on the support 120, and b) a line connecting centers of the balls 121 and 122 that are close to the first moving portion 130 among the three balls 121, 122, and 123 supporting the support 120 on the prop 110, cross each other, as illustrated in FIG. 7A. In other words, the two balls 137 and 138 supporting the first moving portion 130 on the support 120 become two points of application of an attractive force that is generated due to a magnetic force that acts between the first magnet 151 and the first yoke 153, as illustrated in FIG. 7B, and force is applied to the balls 137 and 138 in a direction in which the first moving portion 130 is pulled toward the prop 110. In addition, the balls 121 and 122 that support the support 120 on the prop 110 become two supporting points. In this way, a line connecting the two points of application and a line connecting the two supporting points are made cross each other so that a portion 120c of the support 120 that is close to the second moving portion 140 can be prevented from being rotated around the line connecting two supporting points.

For example, referring to FIG. 8A, it is assumed that the line connecting centers of the two balls 137 and 138 supporting the first moving portion 130 on the support 120 is formed to be outside than (or with respect to the lens L) the line connecting centers of the balls 121 and 122 that are close to the first moving portion 130 among the three balls 121, 122, and 123 supporting the support 120 on the prop 110. In this case, since the two points of application of the attractive force that is generated due to the magnetic force, if the force is applied to the two points of application in a direction in which the first moving portion 130 is pulled toward the prop 110, the portion 120c of the support 120 that is close to the second moving portion 140 is rotated around the line connecting the two supporting points. Then, the support 120 is inclined toward a plane that is perpendicular to the optical axis of the lens L and as such, image shake occurs or focusing is not performed well performed.

Thus, at least one of the two points of application of the attractive force that is generated due to the magnetic force is disposed to be arranged inside (with respect to the lens L) the line connecting the two supporting points, thereby preventing the portion 120c of the support 120 that is close to the second moving portion 140 from being rotated around the line connecting the two supporting points. Similarly, like in the case of points of application and supporting points that are close to the second moving portion 140, at least one of the two points of application of the attractive force that is generated due to the magnetic force is disposed to be arranged inside (with respect to the lens L) of the line connecting the two supporting points, thereby preventing the portion 120c of the support 120b that is close to the first moving portion 130 from being rotated around the line connecting the two supporting points.

In addition, referring to FIG. 7A, the three balls 121, 122, and 123 that support the support 120 according to the current embodiment are arranged to be separated from the lens L as much as possible. As such, the range of a triangle that is defined by a line connecting the center of each of the balls 121, 122, and 123 is wider than the case where the balls 121, 122, and 123 are arranged as illustrated in FIG. 8A. The support range of the balls 121, 122, and 123 that support the support 120 is maximized so that the lens L can be prevented from being inclined in a tilt direction and the lens L can be stably supported.

Figure 10:
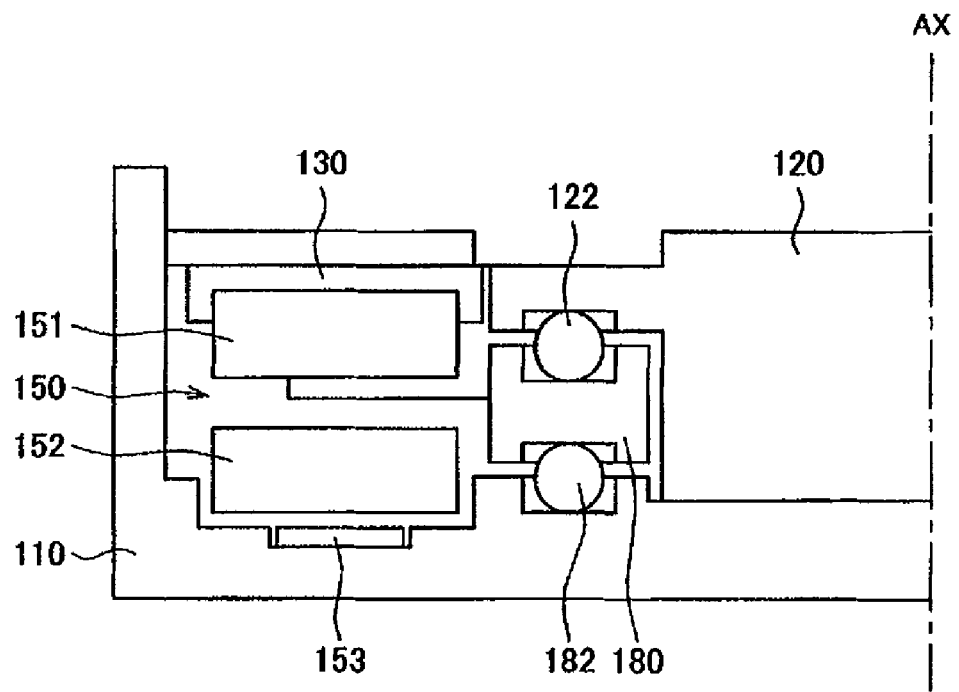
FIG. 10 is a pictorial diagram that illustrates how the prop and the support of the image shake correction device are supported, according to another embodiment of the present invention.

In addition, in the image shake correction device 100 according to the current embodiment, a sliding portion 180 having lubrication may be arranged between the balls 121, 122, and 123 that support the support 120 on the prop 110 and the prop 110, as illustrated in FIG. 10.

Figure 9:
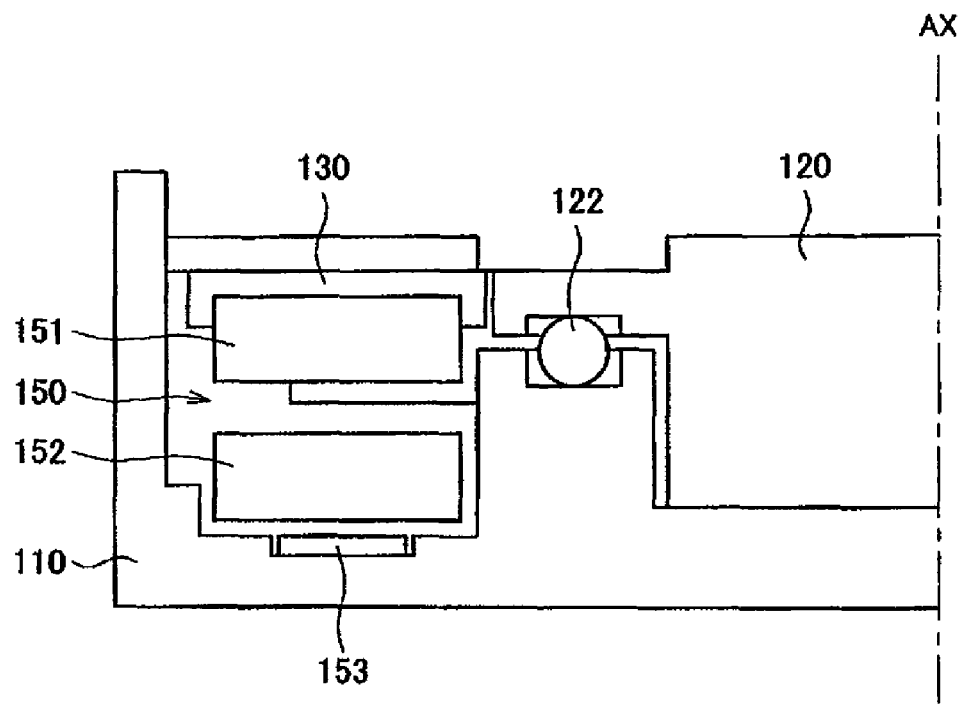
FIG. 9 is a pictorial diagram that illustrates how the prop and the support of the image shake correction device illustrated in FIG. 1 are supported, according to an embodiment of the present invention.

In the image shake correction device 100 according to the current embodiment, the support 120 is supported on the prop 110 by using the balls 121, 122, and 123 at three points. FIG. 9 illustrates how the prop 110 and the support 120 of the image shake correction device 100 illustrated in FIG. 1 are supported, according to an embodiment of the present invention, and FIG. 10 illustrates how the prop 110 and the support 120 of the image shake correction device 100 illustrated in FIG. 1 are supported, according to another embodiment of the present invention.

In FIG. 9, only the ball 122 is shown but the other balls 121 and 123 are similarly arranged in the image shake correction device 100 according to the current embodiment.

The balls 121, 122, and 123 are arranged to be always rolled since a smaller frictional force occurs when they are rolled than the case where they are slid. However, when shock is applied to the photographing device in a still state, the balls 121, 122, and 123 are slid. In this case, a coefficient of friction on the surface of the prop 110 that the balls 121, 122, and 123 contact may be made small so that the balls 121, 122, and 123 are returned to their original positions and make a rolling motion even when sliding friction is large.

The prop 110 according to the current embodiment supports the support 120 and is a base for a shutter and thus other members may be installed at the prop 110. Accordingly, it is not easy to change a material for forming the prop 110 that functions in various ways. Thus, there is a limitation in making a coefficient of friction of the prop 110 small. Thus, the sliding portion 180 formed of material having a small coefficient of friction may be arranged in the image shake correction device 100 according to the current embodiment.

The sliding portion 180 is arranged between the prop 110 and the support 120, as illustrated in FIG. 10, and a ball 182 is arranged between the prop 110 and the sliding portion 180, and a ball 122 is arranged between the sliding portion 180 and the support 120, as illustrated in FIG. 10. The sliding portion 180 is formed of material having a small coefficient of friction and may be formed of a material containing a large amount of carbon or a highly lubricant material. In this way, the sliding portion 180 having lubrication is installed between the support 120 and the prop 110 so that a frictional force generated in a portion where the sliding portion 180 contacts the balls 122 or 182 can be reduced.

Accommodation portions for balls that are formed in the prop 110, the sliding portion 180, and the support 120, may be formed as concave portions having an approximately rectangular cross-section in a direction perpendicular to the optical axis AX of the lens L, for example. In this case, the accommodation portions are formed in such a way that the balls accommodated in the accommodation portions do not collide with inner walls of the concave portions when the support 120 is moved on the X-Y plane so that image shake correction can be performed. This is because, when the balls collide with the inner walls of the concave portions, rolling motion of the balls is changed into a sliding motion and a frictional force that is generated between the balls and the accommodation portions increases. Since a frictional force that is generated when the balls make rolling motion is small, the effect of the frictional force on image shake correction can be reduced and image shake correction accuracy can be improved.

The structure and operation of the image shake correction device 100 according to the current embodiment have been described above. The support 120 of the image shake correction device 100 according to the current embodiment is moved due to a driving force that is transferred to the support 120 from the first and second moving portions 130 and 140 in a direction that is perpendicular to the optical axis of the lens L and in which the first and second moving portions 130 and 140 cross each other.

In this case, when the support 120 is moved in the X-direction, only the first moving portion 130 and the support 120 move due to the first driving portion, and the second moving portion 140 is fixed on the prop 110 and does not move. On the other hand, when the support 120 is moved in the Y-direction, only the second moving portion 140 and the support 120 move due to the second driving portion, and the first moving portion 130 is fixed on the prop 110 and does not move.

In this way, the two moving portions 130 and 140 are installed separately from the support 120 so that a driven weight that is generated when the support 120 is moved can be reduced, and a correction performance of the lens L can be improved. In addition, each of the first moving portion 130 and the second moving portion 140 moves only in one direction. Thus, when one of the first moving portion 130 and the second moving portion 140 moves, the other one does not move. Thus, a range in which each of the first moving portion 130 and the second moving portion 140 moves is smaller than a range in which each of the first moving portion 130 and the second moving portion 140 moves when the support 120 is formed as one body with the first and second moving portions 130 and 140 that move the support 120 in the X-direction and the Y-direction. Thus, the sizes of the first coil 152 and the second coil 162 which are sources for generating a driving force do not need to be increased in consideration of movement of one of the first moving portion 130 and the second moving portion 140 according to movement of the other one thereof. In this way, the sizes of the first coil 152 and the second coil 162 can be reduced compared to the related art, and the image shake correction device 100 can be miniaturized. In addition, an attractive force that acts between the first magnet 151 and the first yoke 153 and an attractive force that acts between the second magnet 161 and the second yoke are used, the support 120 is pressurized toward the prop 110, movement of the support 120 in a tilt direction can be suppressed, and correction accuracy can be improved.

Second Embodiment

Next, an image shake correction device according to another embodiment of the present invention will be described with reference to FIGS. 11 through 15. The image shake correction device according to the current embodiment is different from the image shake correction device 100 according to the first embodiment in terms of a pressurizing member that pressurizes a support toward a prop. Hereinafter, a difference between the first and second embodiments will be described, and a description of the same structure and operation will not be repeated.

Figure 11:
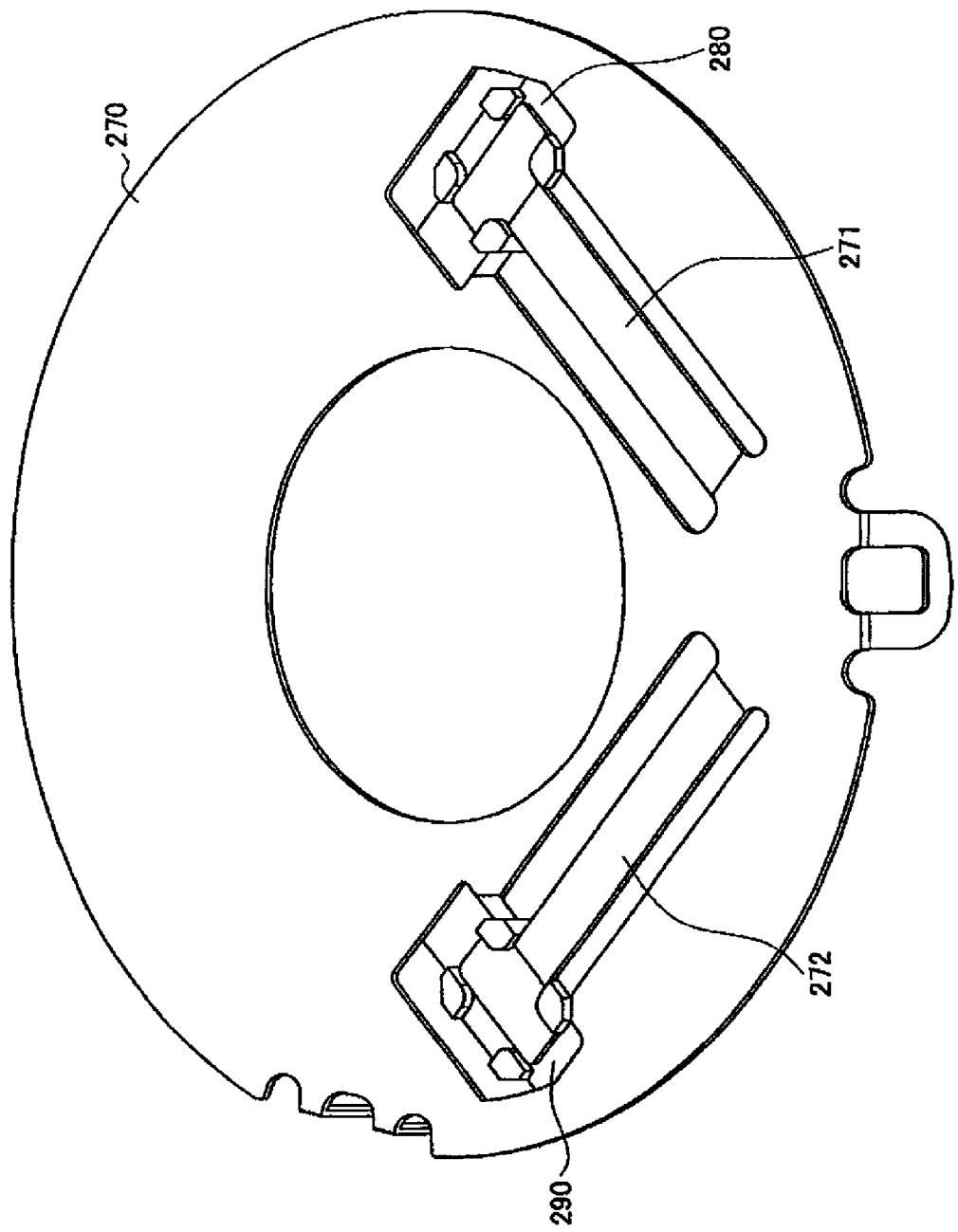
FIG. 11 is a perspective view of a pressurizing member of an image shake correction device according to another embodiment of the present invention.
Figure 12:
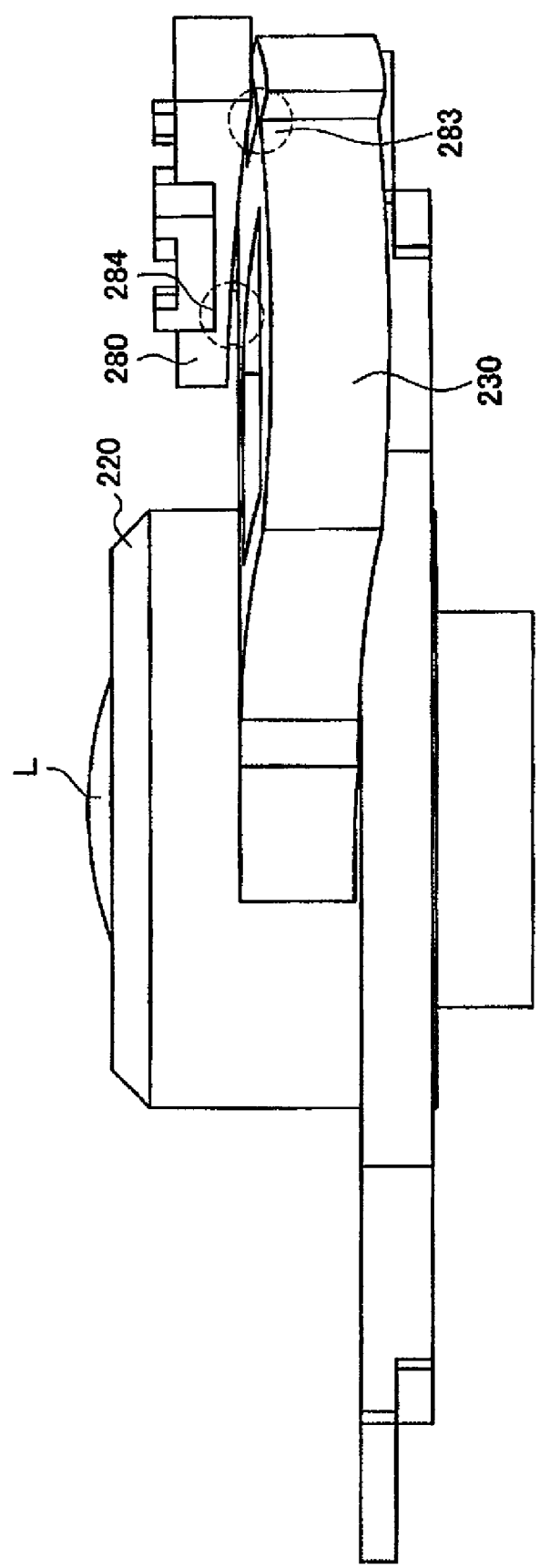
FIG. 12 is a partial side view of a support, a first moving portion, and a guide member of an image shake correction device including the pressurizing member illustrated in FIG. 11, according to an embodiment of the present invention.
Figure 13:
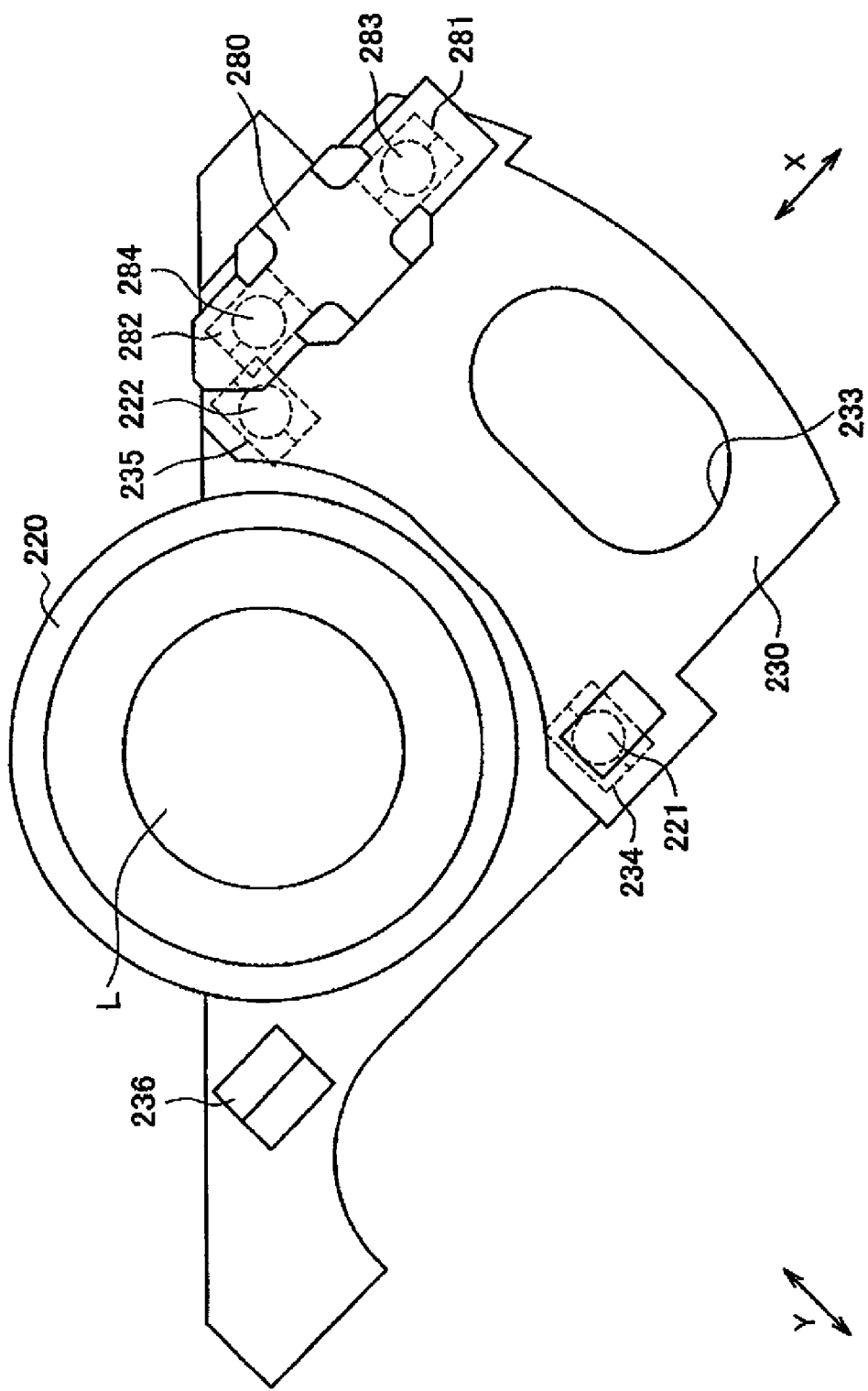
FIG. 13 is a plan view of FIG. 12, according to an embodiment of the present invention.
Figure 14:
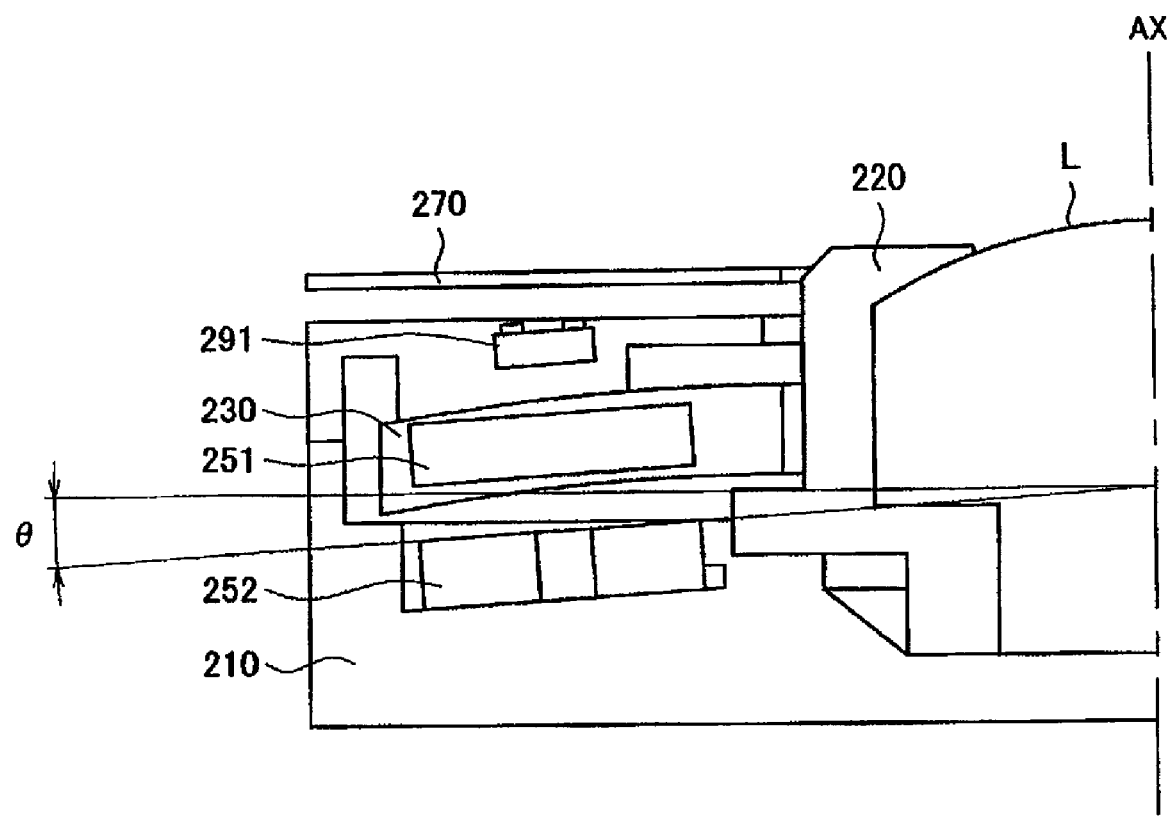
FIG. 14 is a pictorial diagram that illustrates the arrangement of a magnet and a coil of the image shake correction device described with reference to FIGS. 11 through 13, according to an embodiment of the present invention.
Figure 15:
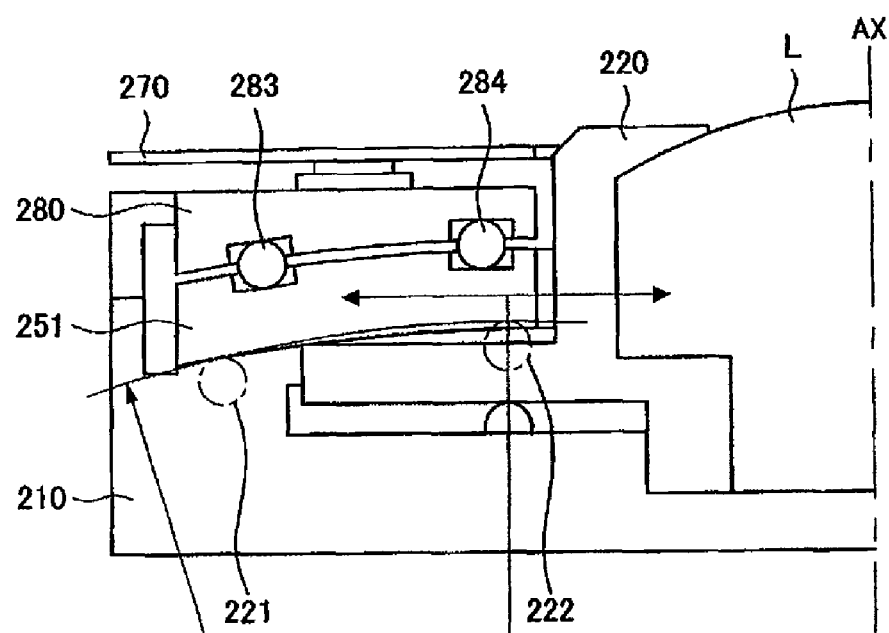
FIG. 15 is a pictorial diagram for explaining an operation of the image shake correction device described with reference to FIGS. 11 through 14, according to an embodiment of the present invention.

FIG. 11 is a perspective view of a pressurizing member of an image shake correction device according to another embodiment. FIG. 12 is a partial side view of a support, a first moving portion, and a guide member of the image shake correction device including the pressurizing member illustrated in FIG. 11. FIG. 13 is a plan view of FIG. 12. FIG. 14 illustrates the arrangement of a magnet and a coil of the image shake correction device according to the current embodiment. FIG. 15 is a diagram for explaining an operation of the image shake correction device according to the current embodiment.

Referring to FIGS. 11 through 15, the image shake correction device according to the current embodiment includes a support 220 that is supported by using a prop 210 and supports a lens L, a first moving portion 230 that moves the support 220 in a first direction, a second moving portion (not shown) that moves the support 220 in a second direction, a first driving portion that drives the first moving portion 230, and a second driving portion that drives the second moving portion (not shown). The structure of the elements may be the same as that of FIGS. 1 through 3.

As described above, the image shake correction device according to the current embodiment is different from the image shake correction device 100 according to the first embodiment in terms of the pressurizing member. The pressurizing member according to the current embodiment is realized by forming a cover plate 270 as a flat spring. As such, the pressurizing member pressurizes the support 220 toward the prop 210.

Referring to FIG. 11, the cover plate 270 comprises an approximately disc-shaped flat spring in which the lens L supported by the support 220 is arranged. The cover plate 270 includes a first elastic portion 271 that pressurizes the first moving portion 230 and a second elastic portion 272 that pressurizes the second moving portion.

The first elastic portion 271 and the second elastic portion 272 may comprise rectangular notches that are formed in the cover plate 270 in positions that correspond to the first moving portion 230 and the second moving portion, for example, and only one end of each of the first elastic portion 271 and the second elastic portion 272 is connected to the cover plate 270. As such, as a portion of the first elastic portion 271 and the second elastic portion 272 are separated from the cover plate 270, the first elastic portion 271 and the second elastic portion 272 protrude downwards toward the prop 210 due to an elastic force.

Guide members 280 and 290 that guide the first moving portion 230 and the second moving portion in a predetermined direction, are arranged at the other end that is opposite to a portion connecting the first and second elastic members 271 and 272 to the cover plate 270, of the portion of the first elastic portion 271 and the second elastic portion 272.

The guide member 280 transfers a pressurized force that is applied toward the prop 210 due to the first elastic portion 271 to the first moving portion 230 when a ball is accommodated between the guide member 280 and the second moving portion and simultaneously guides the first moving portion 230 to move only in a predetermined direction. The guide member 280 includes guide portions 281 and 282 that accommodate balls 283 and 284 between the guide member 280 and the first moving portion 230. The guide portions 281 and 282 are approximately V-shaped grooves that extend in the X-direction, and the first moving portion 230 moves due to the first driving portion in a direction (X-direction) in which the guide portions 281 and 282 extend. In addition, since Y-direction movement of the first moving portion 230 is constrained due to the approximately V-shaped groove of the guide portions 281 and 282, the first moving portion 230 does not move in the Y-direction.

The guide member 290 includes, for example, two guide portions (not shown) that accommodate a ball between the guide member 290 and the second moving portion, similarly to the guide member 280. The guide portions are approximately V-shaped grooves that extend in the Y-direction. The second moving portion moves due to the second driving portion in a direction (Y-direction) in which the guide portions extend. In addition, X-direction movement of the second moving portion is constrained due to the approximately V-shaped grooves of the guide portions and thus the second moving portion does not move in the X-direction.

Thus, when the support 220 of the lens L is moved in the X-direction, only the first moving portion 230 and the support 220 move due to the first driving portion, and the second moving portion is fixed on the prop 210 and does not move. On the other hand, when the support 220 is moved in the Y-direction, only the second moving portion and the support 220 move due to the second driving portion, and the first moving portion 230 is fixed on the prop 110 and does not move.

The first and second elastic portions 271 and 272 that pressurize the first moving portion 230 and the second moving portion are arranged on the cover plate 280. Thus, the first moving portion 230 and the second moving portion that are pressurized by the first and second elastic portions 271 and 272 pressurize the support 220. As such, shaking of the support 220 in a tilt direction can be suppressed so that image shake correction accuracy can be improved. In addition, since the cover plate 270 is used as a pressurizing member, an increase in the number of parts of the image shake correction device can be suppressed, and the image shake correction device can be miniaturized.

Here, in the image shake correction device according to the current embodiment, two pairs of coils and magnets that are driving portions for driving the first moving portion 230 and the second moving portion may be arranged to be inclined toward a plane that is perpendicular to the optical axis (AX) of the lens L, as illustrated in FIG. 14.

FIG. 14 illustrates a cross-section of the first moving portion 230 on the plane that is perpendicular to the optical axis AX. The first driving portion driving the first moving portion 230 includes a first magnet 251 arranged at the first moving portion 230 and a first coil 252 arranged at the prop 210 to be opposite to the first magnet 251. Here, the first magnet 251 and the first coil 252 are arranged to be inclined by an angle θ with respect to the plane that is perpendicular to the optical axis AX, as illustrated in FIG. 14. In this way, the first magnet 251 and the first coil 252 are arranged to be inclined so that the image shake correction device can be miniaturized in a direction that is perpendicular to the optical axis AX.

The angle θ that is formed between the plane perpendicular to the optical axis AX and the first coil 251 and the first coil 252 may be about 5°, for example. In addition, a surface of a hole element 291 that detects the amount of movement of the first moving portion 230 and is opposite to the first magnet 251 and the first coil 252, is inclined by θ with respect to the plane perpendicular to the optical axis AX, similarly to the first magnet 251 and the first coil 252. In FIG. 14, only the structure of the first moving portion 230 has been described but the structure of the second moving portion is the same as that of the first moving portion 230.

In addition, as described with reference to FIG. 14, when the first magnet 251 and the first coil 252 are arranged to be inclined, a direction in which a driving force that acts on the first moving portion 230 and the second moving portion is applied is not a direction that is perpendicular to the optical axis of the lens L. Then, the position of the support 220 that supports the lens L cannot be precisely corrected.

Thus, as illustrated in FIG. 15, a tangent line of an arc-shaped track of the first moving portion 230 that is placed at a ball 222 transferring a driving force generated by the first driving portion to the support 220 is approximately perpendicular to the optical axis AX of the lens L.

The amount of movement generated due to image shake correction of the lens L may be about 0.2-0.3 mm, for example. Thus, when a curvature radius R of a track on which the first moving portion 230 moves is much greater than the amount of movement of the lens L, movement of the first moving portion 230 at the ball 222 may be approximately perpendicular to the optical axis AX of the lens L. The support 220 that is moved in the X-direction together with the first moving portion 230 is moved in a direction that is approximately perpendicular to the optical axis AX of the lens L.

As such, even when the first magnet 251 and the first coil 252 that are sources for generating a driving force used to move the first moving portion 230 and the second moving portion are arranged to be inclined, a driving force can be transferred while unnecessary force is not generated in the direction of the optical axis AX with respect to the support 220. In other words, the image shake correction device can be miniaturized and simultaneously, the support 220 that supports the lens L can be stably driven. In addition, the second moving portion that moves the support 220 in the Y-direction has the same structure as the first moving portion 230 illustrated in FIG. 15. In addition, when the curvature radius R of the track of the first moving portion 230 is reduced, the size of the image shake correction device in a direction that is perpendicular to the optical axis AX can be reduced. However, when the first coil 252 is extremely inclined or the curvature radius R is excessively reduced, driving efficiency is lowered.

The image shake correction device according to the current embodiment has been described above. The support 220 of the image shake correction device according to the current embodiment is moved due to a driving force that is transferred to the support 220 from the first moving portion 230 and the second moving portion in a direction that is perpendicular to the optical axis of the lens L and in which the first moving portion 230 and the second moving portion cross each other.

In this case, when the support 220 is moved in the X-direction, only the first moving portion 230 and the support 220 move due to the first driving portion, and the second moving portion is fixed on the prop 210 and does not move. On the other hand, when the support 220 is moved in the Y-direction, only the second moving portion and the support 220 move due to the second driving portion, and the first moving portion 230 is fixed on the prop 210 and does not move.

In this way, the first moving portion 230 and the second moving portion are installed separately from the support 220 so that a driven weight that is generated when the support 220 is moved can be reduced, and a correction performance of the lens L can be improved. In addition, each of the first moving portion 230 and the second moving portion moves only in one direction. Thus, when one of the first moving portion 230 and the second moving portion moves, the other one does not move. Thus, compared to the case when the support 220 is formed as one body with the first moving portion 230 and the second moving portion that move the support 220 in the X-direction and the Y-direction, the size of the first coil 252 as a source for generating a driving force does not need to be increased in consideration of movement of one of the first moving portion 230 and the second moving portion according to movement of the other one thereof so that the image shake correction device can be miniaturized.

In addition, the cover plate 270 comprises a flat spring, and the two moving portions are pressurized toward the prop 210 by using an elastic force of the flat spring so that shaking of the support 220 in a tilt direction can be suppressed and correction accuracy can be improved. In addition, the first magnet 251 and the first coil 252 that constitute the driving portion are inclined toward the plane that is perpendicular to the optical axis AX of the lens L so that the image shake correction device can be miniaturized.

While the present invention has been particularly shown and described with reference to exemplary embodiments thereof, it will be understood by those of ordinary skill in the art that various changes in form and details may be made therein without departing from the spirit and scope of the present invention as defined by the following claims.

For example, each of the driving portions that drive the moving portions is a VCM. However, the present invention is not limited thereto. For example, each of the driving portions may be an actuator that is driven in only one direction, such as a piezoelectric device. The image shake correction device according to the present invention includes a first moving portion that moves a lens in a first direction and a second moving portion that moves the lens in a second direction, which move independently. Thus, the first moving portion and the second moving portion may move in only one direction and thus, the actuator that is driven in only one direction can be used.

In addition, in the above-described embodiments, the first moving portion and the second moving portion are arranged on the same plane that is perpendicular to the optical axis of the lens. However, the present invention is not limited to the embodiments described, and for example, a portion of the first moving portion and the second moving portion may overlap with each other.

In addition, in the above-described embodiments, a ball is accommodated in a guide member so that the support and the moving portion can be arranged together. However, the present invention is not limited to the embodiments described, and for example, a shaft is installed between angular bearings of the support and the moving portion so that the support and the moving portion can be arranged together.

In addition, in the above-described embodiments, a magnet is installed at the moving portion, and a coil is installed at a prop. However, the present invention is not limited to the embodiments described, and for example, the magnet may be installed at the prop, and the coil may be installed at the moving portion. In this case, a flexible printed circuit (FPC) which supplies a current to the coil needs to be connected to the moving portion, and the adverse effect of an attractive force acting between magnets affecting a driving force used to move the support can be avoided.

The invention claimed is:

1. An image shake correction device comprising: a support supporting a lens;
   a moving portion installed independently from the support that moves the support on a plane that is approximately perpendicular to an optical axis of the lens, wherein the moving portion comprises a first moving portion moving the support in a first direction and a second moving portion moving the support in a second direction that is perpendicular to the first direction;
   a prop that movably supports the support;
   a pressurizing member that pressures the support toward the prop by applying force to the moving portion;
   a first driving portion that drives the first moving portion;
   a second driving portion that drives the second moving portion; and
   wherein the first driving portion and the second driving portion comprise a magnet that generates a magnetic field that is approximately parallel to the optical axis of the lens and a coil arranged to be opposite to the magnet, and the magnet is installed at one side of sides in which the first moving portion, the second moving portion, and the prop are opposite to one another, and the coil is installed at the other side, and the magnet generates a magnetic field that is approximately perpendicular to a side in which the magnet and the coil are opposite to each other, and the side in which the magnet and the coil are opposite to each other is inclined toward a side that is perpendicular to the optical axis of the lens.

2. The device of claim 1, wherein the first moving portion is fixed on the support in the first direction and simultaneously is installed to be movable towards the support in the second direction, and the second moving portion is installed to be movable towards the support in the first direction and simultaneously is fixed on the support in the second direction.

3. The device of claim 2, wherein each of at least two approximately V-shaped grooves that extend in the second direction is formed in a position in which the first moving portion and the support are opposite to each other, and each of at least two approximately V-shaped grooves that extend in the first direction is formed in a position in which the second moving portion and the support are opposite to each other, and each of a plurality of balls that support the support is arranged between the opposite grooves.

4. The device of claim 1, further comprising a sliding portion having lubrication and arranged between the support and the prop.

5. The device of claim 1, wherein the first driving portion and the second driving portion comprise a magnet that generates a magnetic field that is approximately parallel to the optical axis of the lens and a coil arranged to be opposite to the magnet, and the magnet is installed at one side of sides in which the first moving portion, the second moving portion, and the prop are opposite to one another, and the coil is installed at the other side, and a side in which the magnet and the coil are opposite to each other is approximately perpendicular to the optical axis of the lens.

6. The device of claim 5, wherein the pressurizing member comprises a magnetic member and is arranged between the moving portion and the prop or between the prop and the coil.

7. The device of claim 5, further comprising a shield member arranged in a position in which two magnets disposed at the moving portion or the prop are opposite to each other and reduces an attractive force between the magnets.

8. The device of claim 1, wherein the moving portion moves along a circumferential direction of a circle in which a tangent line in a support position in which the moving portion is supported on the prop is approximately perpendicular to a direction of the optical axis of the lens, and the support is moved in a direction of the tangent line in the support position.

9. The device of claim 1, wherein the pressurizing member comprises a magnetic member and is arranged between the moving portion and the prop or between the prop and the coil.

10. The device of claim 1, further comprising a shield member arranged in a position in which two magnets disposed at the moving portion or the prop are opposite to each other and reduces an attractive force between the magnets.

11. The device of claim 1, wherein at least one of two points of application that are used to pressurize the support toward the prop by using the moving portion is placed toward the lens among regions that are divided by a line connecting two supporting points that are used to support the support on the prop.

12. The device of claim 1, wherein the pressurizing member comprises an elastic member that pressurizes the moving portion toward the prop and is arranged to cover at least a side that is opposite to the prop of sides of the moving portion.

13. The device of claim 12, wherein the pressurizing member comprises a guide portion guiding the moving portion to move only in a predetermined direction.

* * * * *